United States Patent
Nakajima et al.

[11] Patent Number: 6,025,929
[45] Date of Patent: Feb. 15, 2000

[54] APPARATUS AND METHOD FOR CONTROLLING IMAGE PROCESSING BASED ON IMAGE QUALITY AND/OR PROCESSING SPEED AS CONTROL PARAMETERS

[75] Inventors: Nobuyuki Nakajima, Yokohama; Satoru Yamada, Tokyo, both of Japan

[73] Assignee: Canon Kabushiki Kaisha, Tokyo, Japan

[21] Appl. No.: 08/876,597

[22] Filed: Jun. 16, 1997

[30] Foreign Application Priority Data

Jun. 18, 1996 [JP] Japan ................................. 8-156942

[51] Int. Cl.[7] .............................. H04N 1/50; B41J 2/205; B41J 2/21
[52] U.S. Cl. ............................ 358/1.9; 358/502; 358/518; 358/519; 358/534; 347/13; 347/15; 347/43
[58] Field of Search .................................... 395/109, 112; 358/502, 501, 401, 296, 1.9, 1.13, 534, 298, 456, 504, 518, 519; 347/3, 5, 13, 15, 14, 9, 42, 43, 40

[56] References Cited

U.S. PATENT DOCUMENTS

| 4,651,287 | 3/1987 | Tsao ..................................... 358/1.9 |
|---|---|---|
| 5,030,021 | 7/1991 | Kamiya ............................... 400/124.27 |
| 5,635,967 | 6/1997 | Klassen ..................................... 347/15 |
| 5,854,642 | 12/1998 | Takahashi et al. ........................ 347/40 |

FOREIGN PATENT DOCUMENTS

| 0437236 | 7/1991 | European Pat. Off. . |
|---|---|---|
| 0461759 | 12/1991 | European Pat. Off. . |
| 0461810 | 12/1991 | European Pat. Off. . |

*Primary Examiner*—Scott Rogers
*Attorney, Agent, or Firm*—Fitzpatrick, Cella, Harper & Scinto

[57] ABSTRACT

Inputted image data is subjected to image processing by the matching unit 513, luminance-density conversion unit 514, input correction unit 515, masking unit 516, head shading (HS) processing unit 517, tone reproduction curve (TRC) processing unit 518 and binarize processing unit 519. The selecting unit 133 controls at least the on/off of the process operation of the HS processing unit 517 and a binarization method of the binarize processing unit 519, in accordance with an image process condition set by the setting unit 14. On account of the above, when an image is printed, it is possible to easily set image quality and processing speed that is suitable for the usage of an output image.

25 Claims, 26 Drawing Sheets

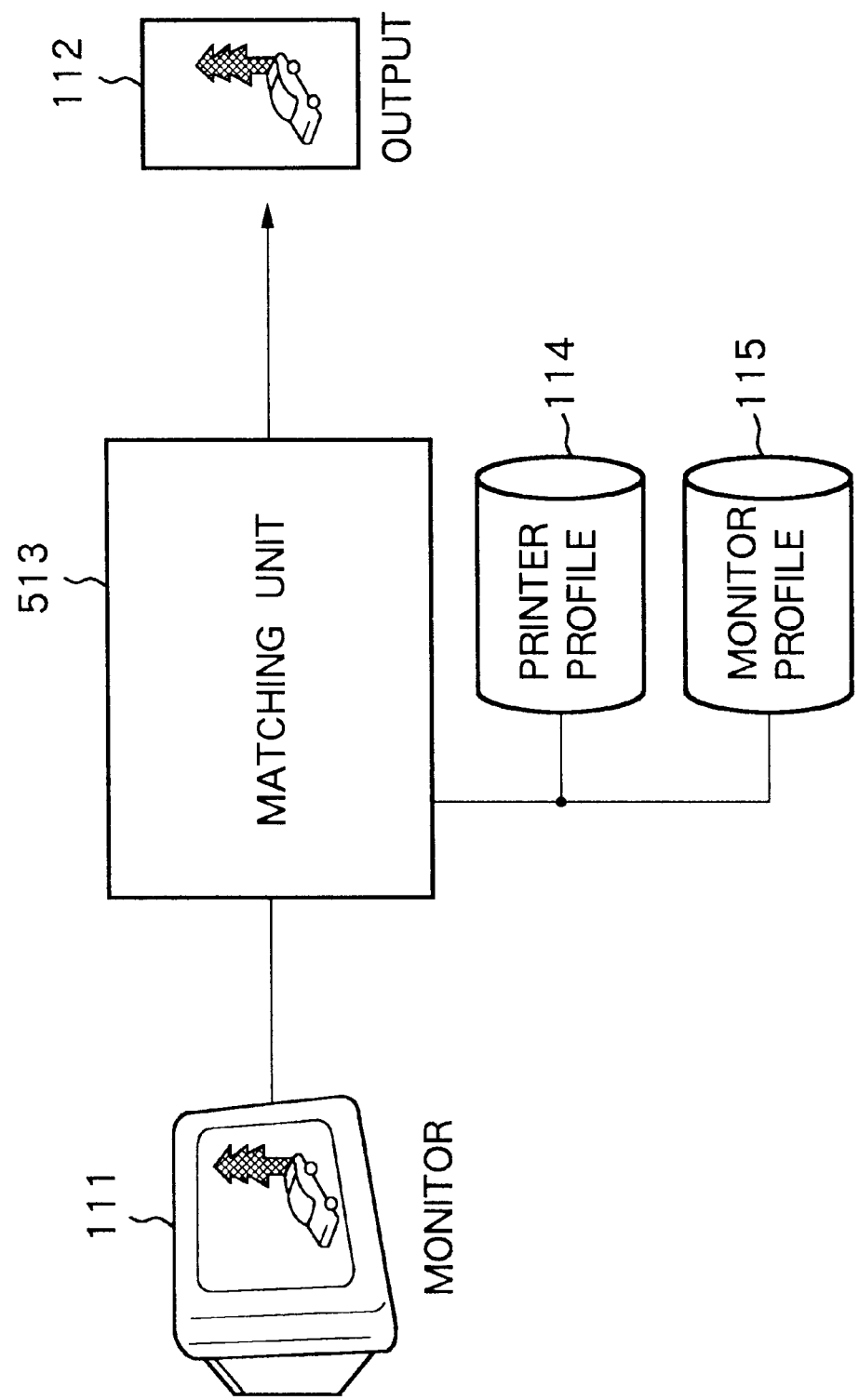

164 165 166

163  162  161

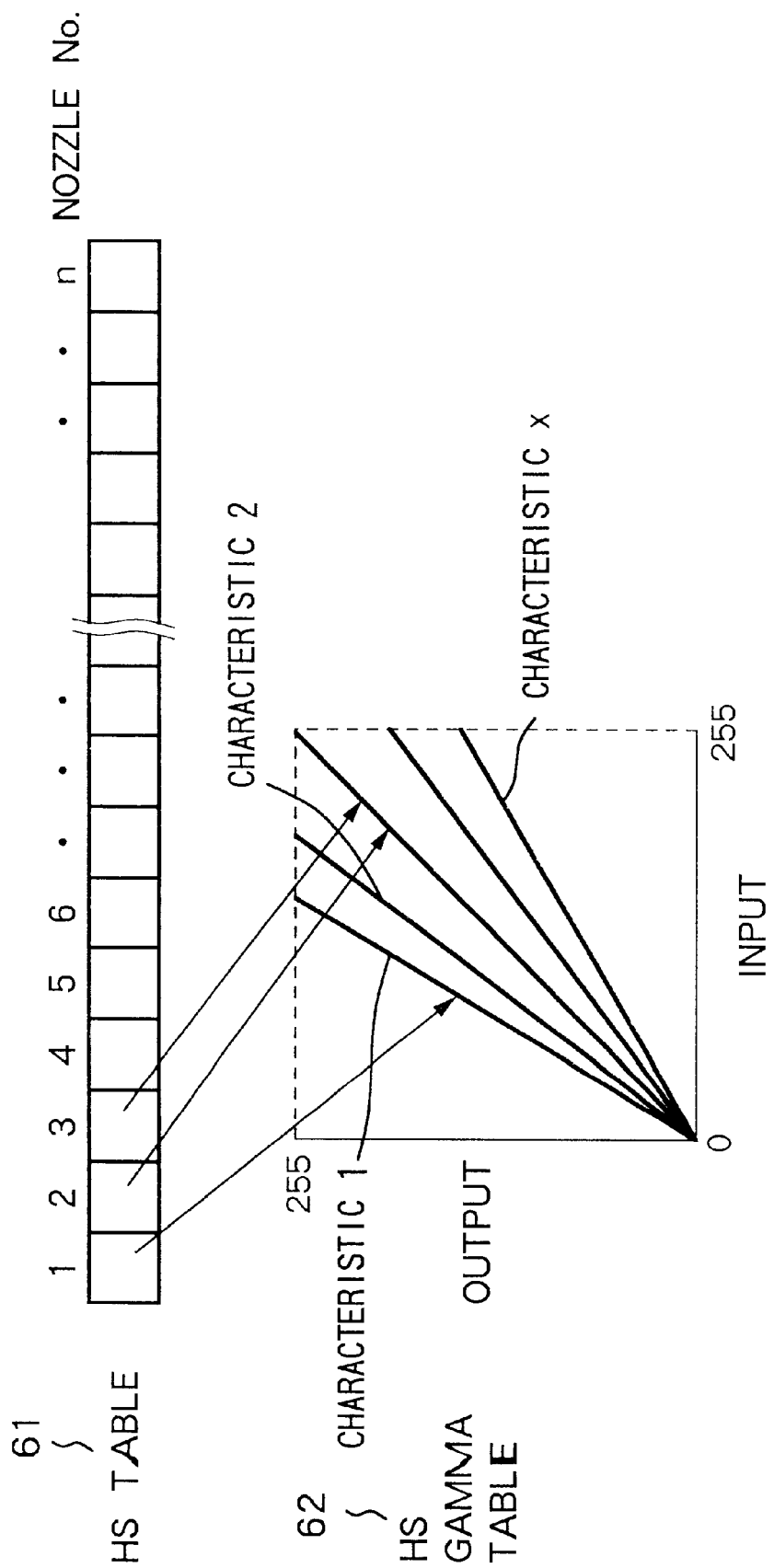

FIG.12A

| | |
|---|---|
| 1 | 0x0000 |
| 2 | 0x0300 |
| 3 | 0x0300 |
| 4 | 0x0200 |
| ⋮ | ⋮ |
| n−1 | 0x0300 |
| n | 0x0400 | n : NOZZLE No.

FIG.12B

| | |
|---|---|
| 0 | 0 |
| 1 | 2 |
| 2 | 4 |
| 3 | 6 |
| ⋮ | ⋮ |
| 254 | 255 |
| 255 | 255 |

FIG.14B
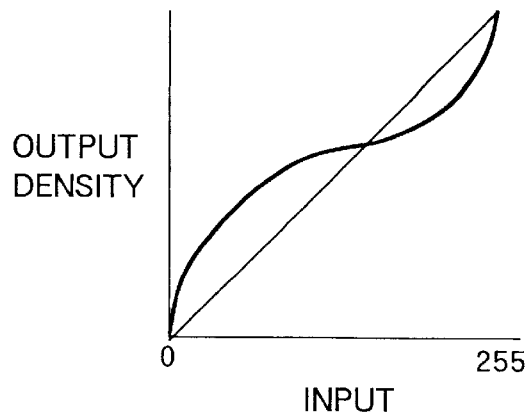
FIG.14C
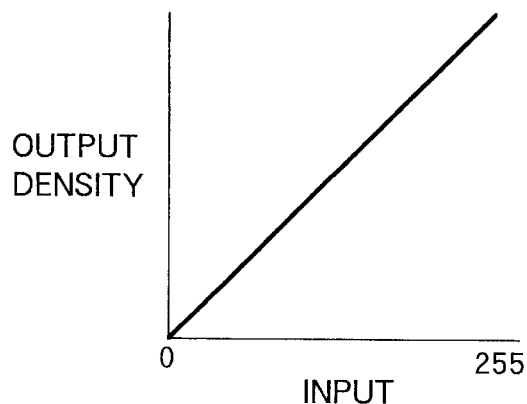
FIG.14D
| | |
|---|---|
| 0 | 0 |
| 1 | 3 |
| 2 | 5 |
| 3 | 7 |
| ⋮ | ⋮ |
| 254 | 255 |
| 255 | 255 |

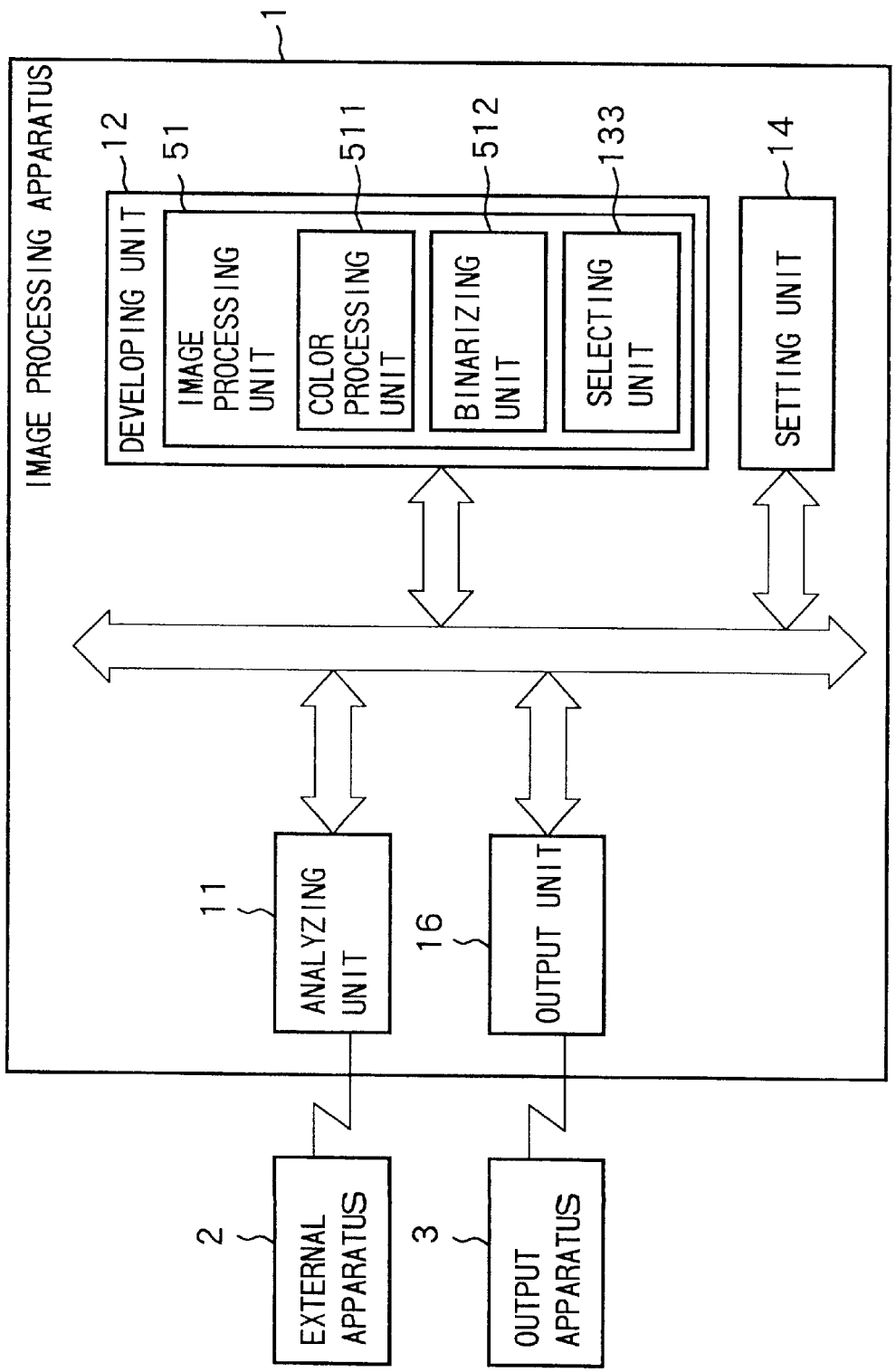

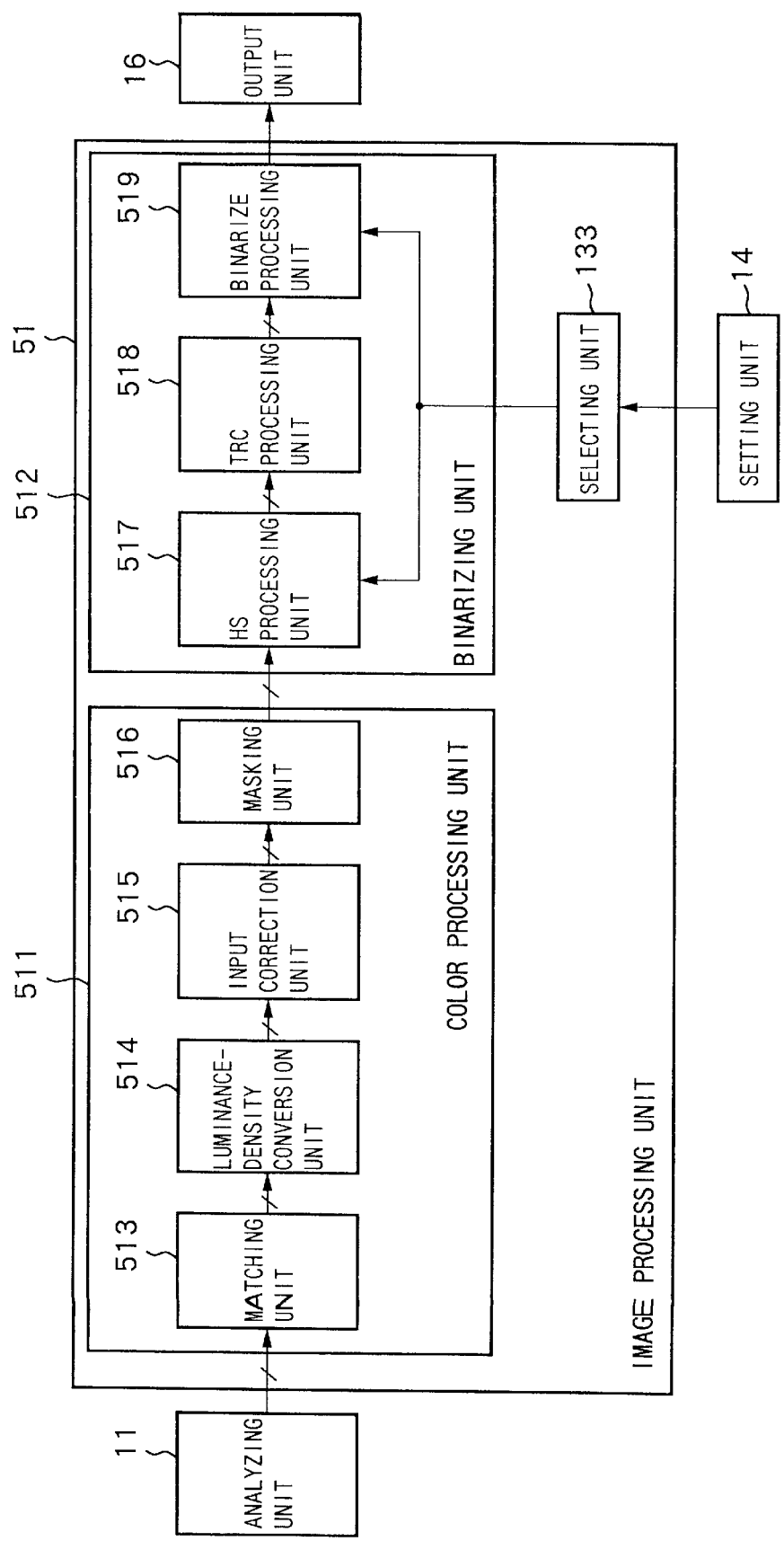

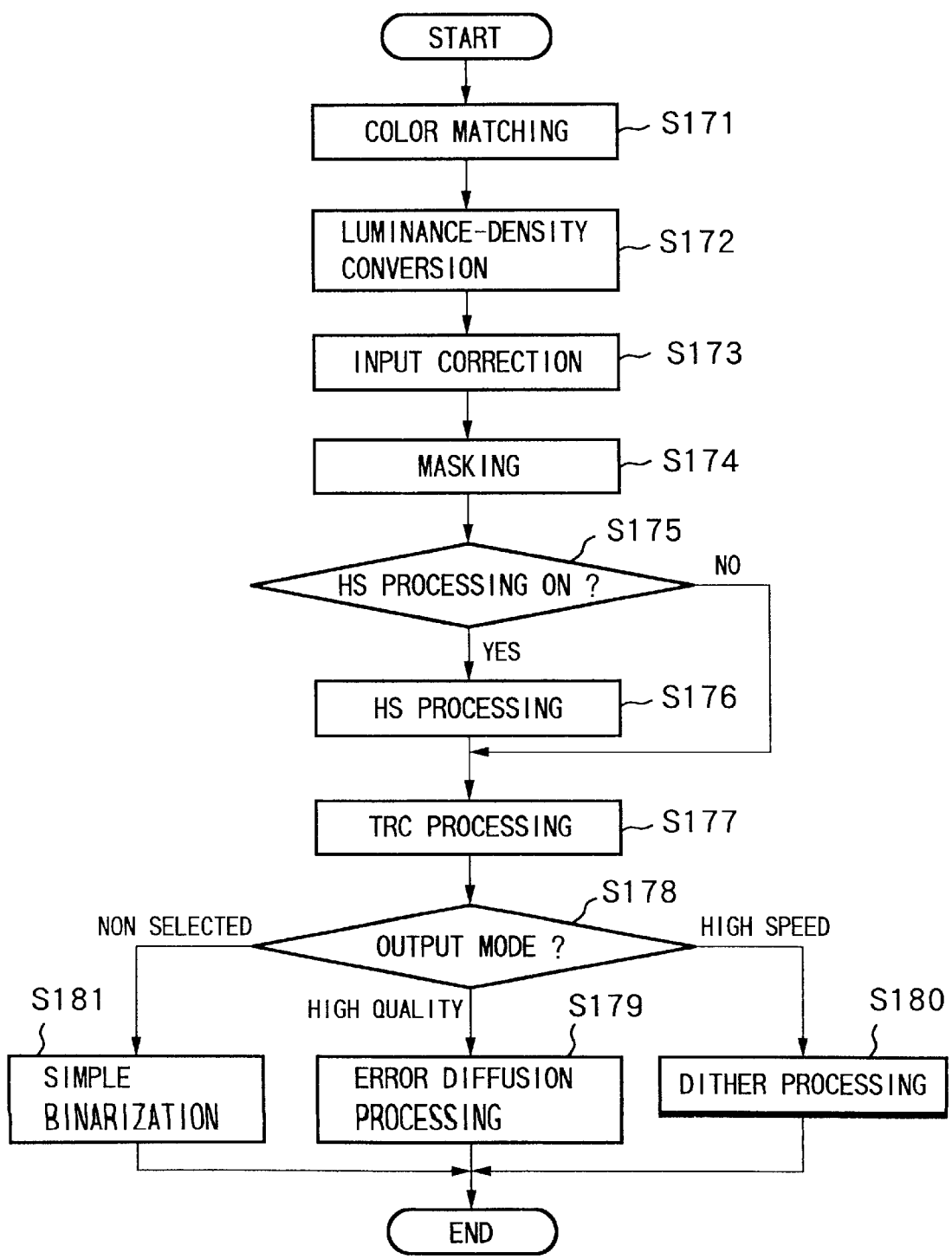

| | | HIGH-SPEED MODE | | | |
|---|---|---|---|---|---|
| | | ON | OFF | | |
| | | | HS | | |
| | | | ON | OFF | |
| HIGH-QUALITY MODE | ON | | | IMAGE QUALITY RANK 1 | IMAGE QUALITY RANK 2 |
| | OFF | HS | | HS | |
| | | ON | OFF | ON | OFF |
| | | | IMAGE QUALITY RANK 5 | IMAGE QUALITY RANK 3 | IMAGE QUALITY RANK 4 |

FIG.21

| LEVEL OF OUTPUT MODE | COLOR MATCHING | LUMINANCE-DENSITY CONVERSION | INPUT CORRECTION | MASKING | HS PROCESSING | TRC PROCESSING | BINARIZATION METHOD | |
|---|---|---|---|---|---|---|---|---|
| | | | | | | | ERROR DIFFUSION | DITHER |
| 1 | ○ | ○ | ○ | ○ | ○ | ○ | ○ | — |
| 2 | × | ○ | ○ | ○ | ○ | ○ | ○ | — |
| 3 | × | ○ | ○ | ○ | × | ○ | — | ○ |
| 4 | × | ○ | × | ○ | × | ○ | — | ○ |
| 5 | × | ○ | × | ○ | × | × | — | ○ |
| 6 | × | ○ | × | × | × | × | — | ○ |

HIGH QUALITY ←→ HIGH SPEED

FIG.28

| DIRECTORY DATA |
| --- |
| : |
| COLOR MATCHING MODULE |
| LUMINANCE – DENSITY CONVERSION MODULE |
| MASKING MODULE |
| HEAD SHADING MODULE |
| TONE REPRODUCTIVE CHARACTERISTIC CORRECTION MODULE |
| QUANTIZATION MODULE |
| IMAGE PROCESS CONTROL MODULE |
| IMAGE PROCESSING CONDITION SETTING MODULE |
| IMAGE ANALYZING MODULE |
| IMAGE PROCESSING CONTENTS DISPLAYNING MODULE |
| : |
| |

FIG.29

| DIRECTORY DATA |
| --- |
| : |
| PRINTING ELEMENT CORRECTION MODULE |
| HALF – TONE PROCESSING METHOD SELECTION MODULE |
| CORRECTION CONDITION SETTING MODULE |
| ERROR DIFFUSION PROCESSING MODULE |
| DITHER PROCESSING MODULE |
| : |
| : |
| : |
| : |
| : |
| |
| |

APPARATUS AND METHOD FOR CONTROLLING IMAGE PROCESSING BASED ON IMAGE QUALITY AND/OR PROCESSING SPEED AS CONTROL PARAMETERS

BACKGROUND OF THE INVENTION

The present invention relates to an image processing apparatus and method thereof, and more particularly, to an image processing apparatus and method thereof for controlling image processing performed on inputted image data.

An image processing apparatus such as a printer or the like, which forms an image on the basis of inputted color image data, inputs R, G and B signals used as the image signals for a monitor, and processes the inputted signals to convert them into C, M, Y and K signals used as image signals for a printer. Then, the ink which corresponds to the C, M, Y and K signals obtained by the above signal conversion is subjected to subtractive mixture to reproduce the color.

FIG. 1 is an explanatory view for explaining the subtractive mixture of colors. Reference numeral 181 denotes surface of a print sheet as a recording medium; 182 to 185, black (k) ink, cyan (C) ink, magenta (M) ink, and yellow (Y) ink respectively; 186, incident light onto the print sheet surface 181; and 187, reflected light from the print sheet surface 181.

In a printer, an image is formed by superimposing the ink 182 to 185 on the print sheet surface 181. In this case, the incident light 186 transmits through the ink layers 185 to 182 until it reaches the print sheet surface 181. Then the light is reflected by the print sheet surface 181, transmits through the ink layers 182 to 185 again and reaches an observer as the reflected light 187. In this process, the ink layers 182 to 185, each of which having a different spectrum absorption characteristic, sequentially absorb energy and change the spectrum characteristics, thus reproducing colors.

FIG. 2 shows the arrangement of an ink-jet printer (hereinafter referred to as "IJP") which forms a color image. Reference numeral 151 denotes a printhead which forms an image on a print sheet 153 by discharging ink having colors of C, M, Y and K; and 152, a line-feed motor for conveying the print sheet 153 to a direction indicated by an arrow. Herein, the printhead 151 includes a plurality of nozzles as recording elements, each of which is the smallest unit of ink discharging operation, arranged such that the plurality of nozzles are arrayed to the width of the print sheet 153 with respect to each of the C, M, Y and K ink. The printhead having such arrangement is hereinafter referred to as a "wide printhead."

The IJP having the above configuration forms one line of an output image by single ink discharge from each of the C, M, Y and K printheads. The ink discharge operation is repeated in synchronization with the conveyance of the print sheet conveyed by the line feed motor 152, to form an image corresponding to one page of an image.

IJP is a printer which forms an image by discharging or not discharging ink in a unit of a pixel. In order to obtain a high quality output image, various image processing is necessary, including the process of converting inputted R, G and B image data to C, M and Y (C, M, Y and K) image data which is quantized for an IJP.

However, in the above described art, the following problem arises. While high quality output image can be obtained on account of the binary image data obtained by performing various image processing for the IJP, the print speed decreases. For instance, the various image processing are performed on original image data such as a document not including many colors. Therefore, process efficiency is poor and it is difficult to improve the print speed. In addition, in printing operation such as draft printing, where a user merely needs to confirm layout of an output image, various processing are performed, resulting in consuming more time than necessary in printing operation. The above problem arises because there has not been any means suggested to selectively utilize a print-quality-oriented image process or a print-speed-oriented image process, in accordance with the usage of an output image.

SUMMARY OF THE INVENTION

The present invention has been made in consideration of the above situation, and has as its object to provide an image processing apparatus and method thereof for controlling image processing in accordance with a usage of an output image.

Another object of the present invention is to provide an image processing apparatus and method thereof which can set an image process in accordance with a usage of an output image.

According to the present invention, the foregoing object is attained by providing an image processing apparatus comprising: correction means for performing correction on inputted image data in accordance with a pixel position; quantization means for quantizing the image data outputted by the correction means; and control means for controlling at least one of correction operation performed by the correction means and a quantization processing method performed by the quantization processing means.

Further, according to the present invention, the foregoing object is attained by providing an image processing apparatus comprising: first process means for performing color matching processing on inputted image data; second process means for converting the image data outputted by the first process means into image data having a desired tone characteristic; third process means for performing masking processing on the image data outputted by the second process means; fourth process means for performing correction on the image data outputted by the third process means in accordance with a pixel position; fifth process means for performing tone correction on the image data outputted by the fourth process means in accordance with a tone reproduction characteristic of the image forming means; quantization means for quantizing the image data outputted by the fifth process means; and control means for controlling at least one of each of the process operation of the first to fifth process means and the quantization method performed by the quantization means.

Still further, according to the present invention, the foregoing object is attained by providing an image processing method for printing an image, utilizing a plurality of printing elements, comprising: a step of correcting unevenness of the plurality of printing elements; a step of selecting a half-tone processing method; and a step of setting correction operation in the correcting step in accordance with the selected half-tone processing method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is an explanatory view for explaining a concept of color matching;

FIG. 11 is an explanatory view for explaining data which is processed for HS processing;

FIGS. 12A and 12B are HS gamma tables;

FIGS. 14A–14D are graphs and a table provided to explain TRC processing;

FIG. 15 is a block diagram showing the arrangement of an image processing apparatus as the first embodiment of the present invention;

FIG. 16 is a block diagram showing the arrangement of an image processing unit shown in FIG. 15;

FIG. 17 is a flowchart showing the image processing performed by the image processing unit shown in FIG. 16;

FIG. 21 is a table showing the combination of levels of an output mode and processing;

FIGS. 28 and 29 show memory maps in a memory medium which store program codes according to the present invention.

DETAILED DESCRIPTION OF THE PREFERRED EMBODIMENTS

Preferred embodiments of the present invention will be described in detail in accordance with the accompanying drawings.

The following description describes application of the present invention to a printer adopting the ink-jet method, which comprises wide printheads. The present invention is also applicable to a printer adopting an electrophotographic printing method to reproduce an image, such as a laser beam printer (LBP) or an LED printer or the like, or an ink-jet printer which forms an image by moving a printhead in a direction perpendicular to a print-sheet conveying direction. In addition, the following description will be provided for a case where image data is binarized in correspondence with the printer adopting the ink-jet method. The present invention is not limited to such printer utilizing binarization but is also applicable to a multi-value printer utilizing quantization in quaternary system or octal system or the like.

First Embodiment

Image Processing in IJP

Figure 1:
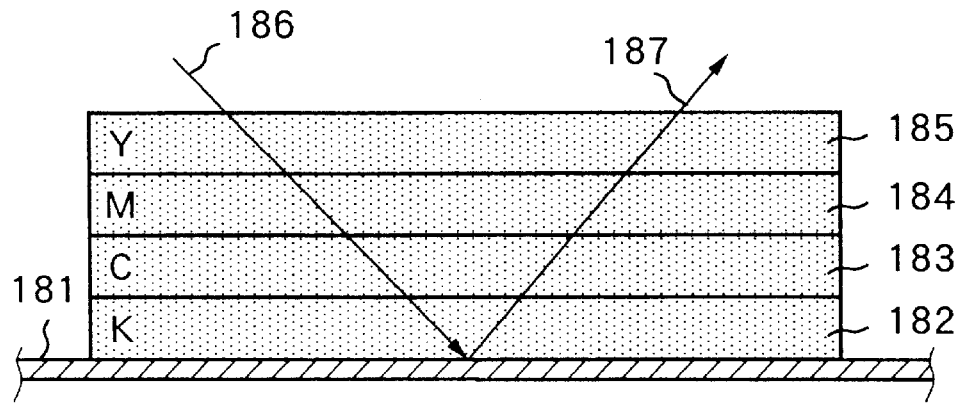
FIG. 1 is an explanatory view for explaining the subtractive mixture of colors.
Figure 2:
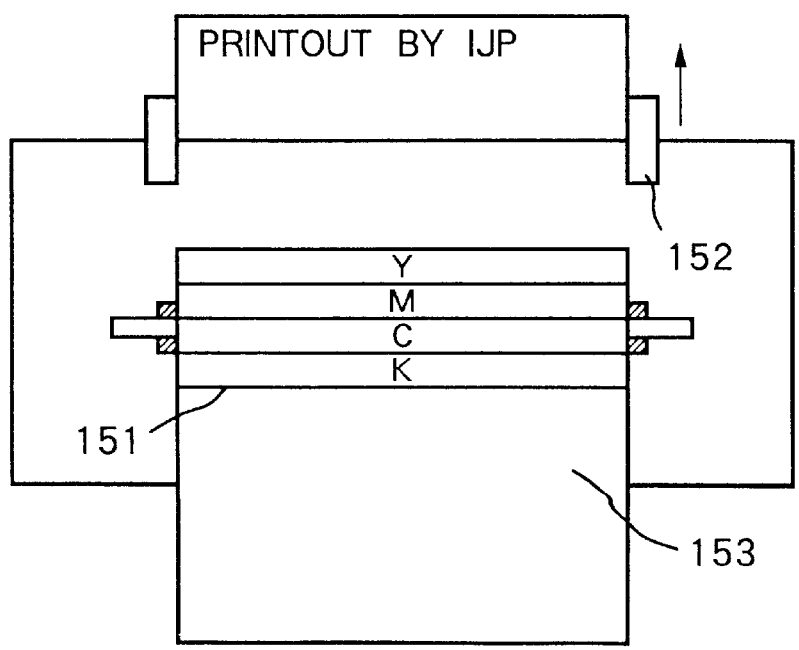
FIG. 2 is a structural view showing the arrangement of an ink-jet printer (hereinafter referred to as "IJP") which forms a color image.
Figure 3:
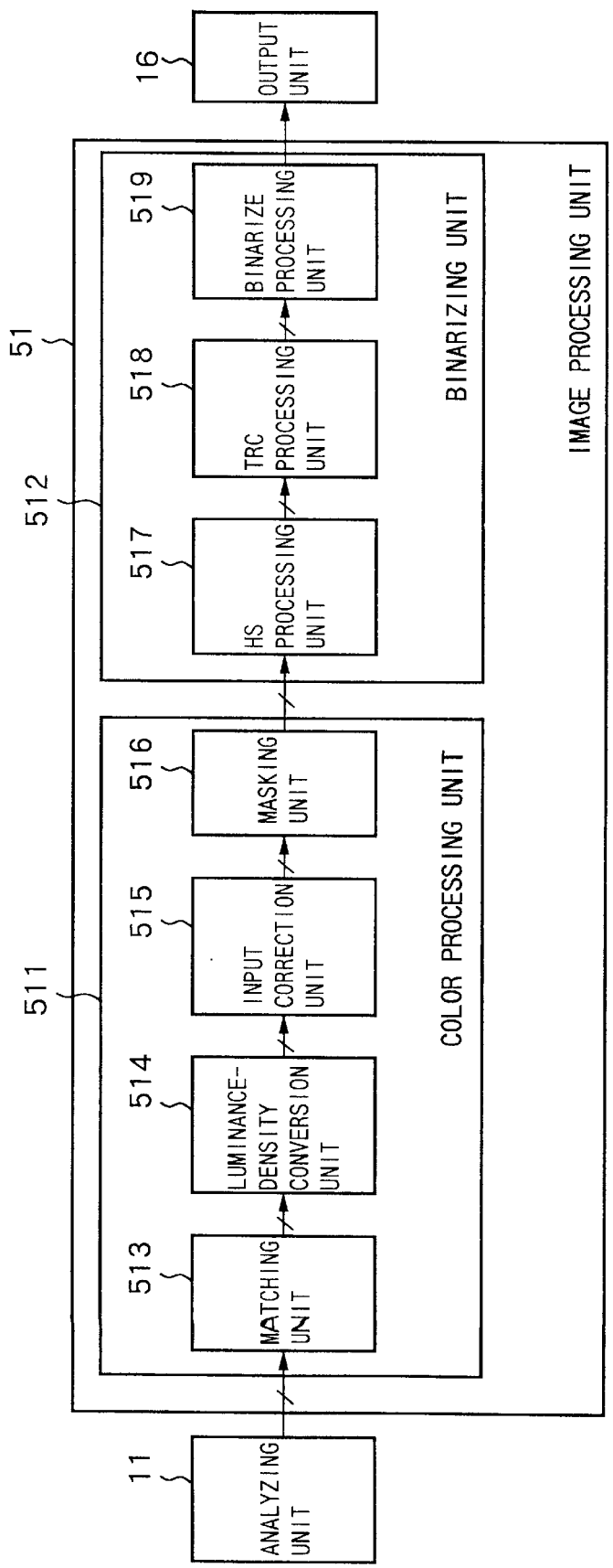
FIG. 3 is a block diagram showing the arrangement of an image processing unit which performs image processing for an IJP.

FIG. 3 is a block diagram showing an arrangement of an image processing unit which performs image processing for an IJP (ink-jet printer). An image processing unit 51 includes a color processing unit 511 and binarizing unit 512. Note that an analyzing unit 11 and output unit 16 will be described later in detail.

Color Processing Unit

A matching unit 513 included in the color processing unit 511 performs color matching. FIG. 4 is an explanatory view for explaining the concept of color matching. A printer forms the image displayed on a monitor 111 upon a print sheet and outputs an output image 112. The matching unit 513 performs color processing on the image data, considering a color reproduction characteristic of the monitor 111 and the printer, to match colors of an output image 112 with the image displayed on the monitor 111. The printer profile 114 and monitor profile 115, referred to by the matching unit 513, are color reproduction characteristic data which is obtained in advance from the devices to be used (the monitor and printer and the like).

Figure 5A:
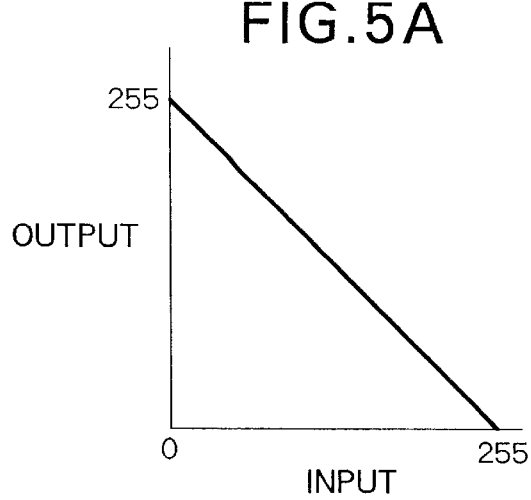
FIGS. 5A and 5B are graphs for explaining luminance-density conversion.
Figure 5B:
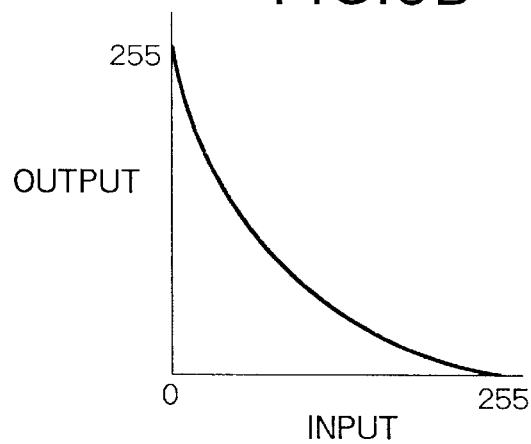

The image data on which color matching has been performed is converted to data indicative of density by a luminance-density conversion unit 514. FIGS. 5A and 5B are graphs showing luminance-density conversion. FIG. 5A shows the conversion characteristic where input signal values 0~255 are converted to their complements 255~0. R, G and B luminance signals representing an input image is converted to C, M and Y density signals which are signals used for printing. FIG. 5B shows the conversion characteristic utilizing logarithmic conversion instead of linear conversion. Normally, the conversion characteristic shown in FIG. 5B is employed. Since luminance-density conversion adopts a look-up table constituted with a ROM or the like, processing speed is same for either of the conversion characteristics.

Figure 6A:
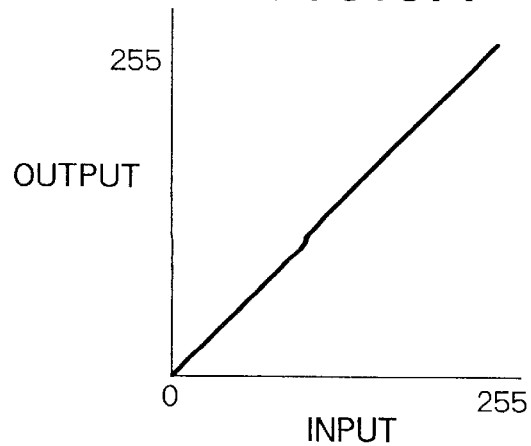
FIGS. 6A and 6B are graphs for explaining input correction.
Figure 6B:
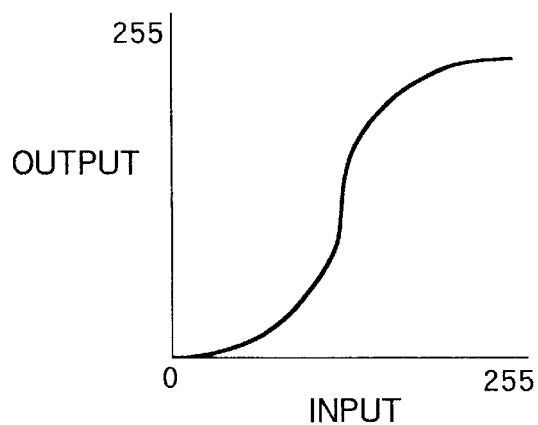

Image data on which luminance-density conversion has been performed is subjected to correction by an input correction unit 515. FIGS. 6A and 6B are graphs for explaining input correction. FIG. 6A is utilized when substantially no correction is to be performed since input signal values 0~255 are converted to 0~255 linearly. FIG. 6B shows a correction characteristic which emphasizes contrast of an image. This characteristic is utilized when, e.g., an image having high contrast is to be obtained, since difference of density between low density portions and high density portions is emphasized in an image. As similar to the processing of luminance-density conversion, a look-up table is also utilized for input data correction. The table data is prepared in accordance with a necessary correction characteristic.

The image data on which input correction has been performed is subjected to masking processing by a masking unit 516, where the image data is converted to data which fits the design concept of image processing. The masking unit 516 temporarily obtains a K signal on the basis of a minimum value min (C, M and Y) of inputted C, M and Y image data, and performs masking processing utilizing one of the following equations.

$$\begin{bmatrix} C' \\ M' \\ Y' \\ K' \end{bmatrix} = \begin{bmatrix} a11 & a12 & a13 & a14 & a15 \\ a21 & a22 & a23 & a24 & a25 \\ a31 & a32 & a33 & a34 & a35 \\ a41 & a42 & a43 & a44 & a45 \end{bmatrix} \begin{bmatrix} C \\ M \\ Y \\ K \\ K^2 \end{bmatrix} \quad (1)$$

$$\begin{bmatrix} C' \\ M' \\ Y' \end{bmatrix} = \begin{bmatrix} a11 & a12 & a13 & a14 & a15 & a16 \\ a21 & a22 & a23 & a24 & a25 & a26 \\ a31 & a32 & a33 & a34 & a35 & a36 \end{bmatrix} \begin{bmatrix} C \\ M \\ Y \\ C \cdot M \\ M \cdot Y \\ Y \cdot C \end{bmatrix} \quad (2)$$

In equation (1), $K^2$, a square value of K, is added to the input value, while equation (2) utilizes a quadratic product term combining C, M and Y instead of K. These forms depend upon how the image processing is designed. Parameters indicated by a11 to a45 are calculated in advance, employing e.g. the least squares method or the like, so that desired output data can be obtained. Note that the above matrix calculation may be executed in real time. However, normally a table is generated on the basis of a result of multiplication performed in advance with respect to input data and each parameter, and the processing with respect to the above matrix calculation is realized by referring to the table stored in a memory such as a ROM. In addition, inputted C, M, Y and K data may be subjected to the well-known UCR in the masking processing.

Binarizing Unit

Figure 7:
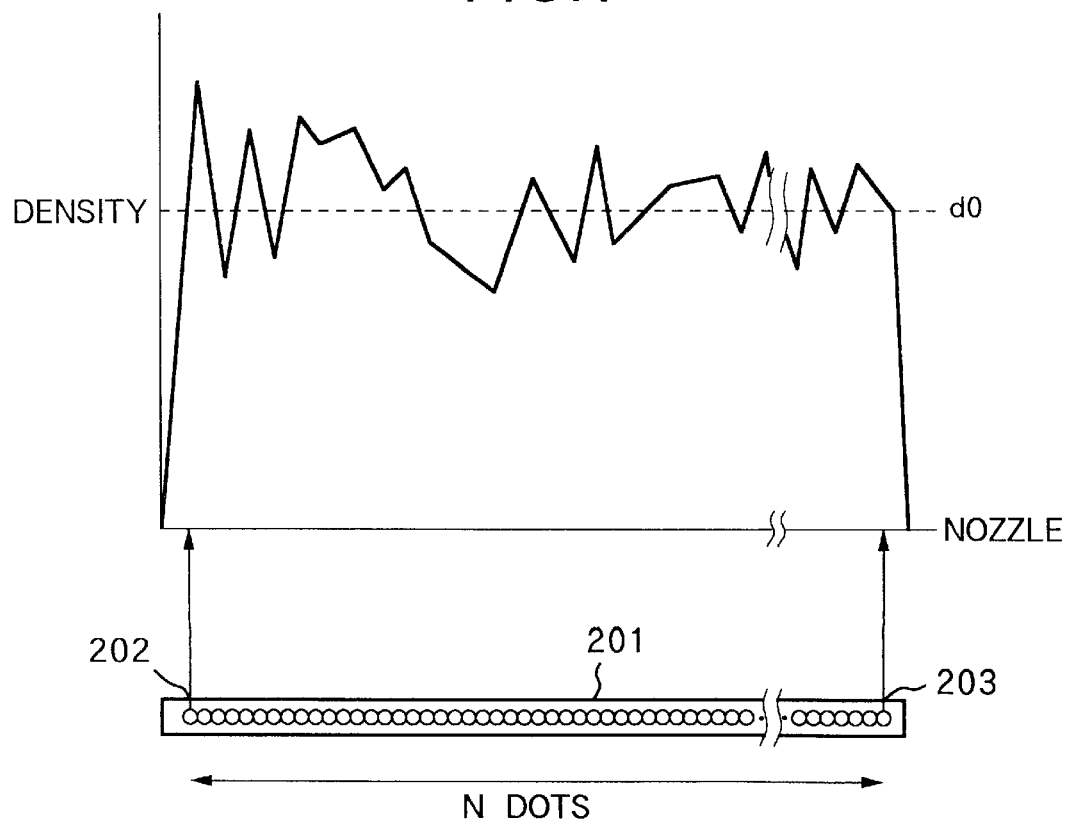
FIG. 7 is an explanatory view showing a characteristic of ink discharge from each nozzle constituting a printhead.

FIG. 7 shows a discharging characteristic of nozzles which constitute a printhead 201. The printhead is constituted with four rows of nozzle arrays each of which represents C, M, Y and K. Herein, description will be provided on one of the four rows as an example. In order to discharge ink, the same level of a signal, which ideally forms a dot having density d0, is added to all nozzles constituting the printhead 201. If density of each of the formed dots is optically measured, the density distribution shown in FIG. 7 is obtained. The density distribution varies depending on each printhead and each nozzle array of C, M, Y and K.

As described above, the printhead 201 includes a plurality of nozzles arrayed in the widthwise direction of a print sheet. Single discharge of ink from a nozzle forms one pixel of an image. One nozzle forms all the pixels arranged in columns in the conveyance direction of a print sheet. If the discharging characteristic of each nozzle varies as shown in FIG. 7, density unevenness such as vertical lines appears in the output image.

Figure 8:
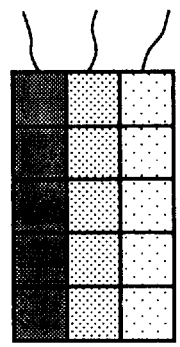
FIG. 8 is an explanatory view for explaining density unevenness.
Figure 9:
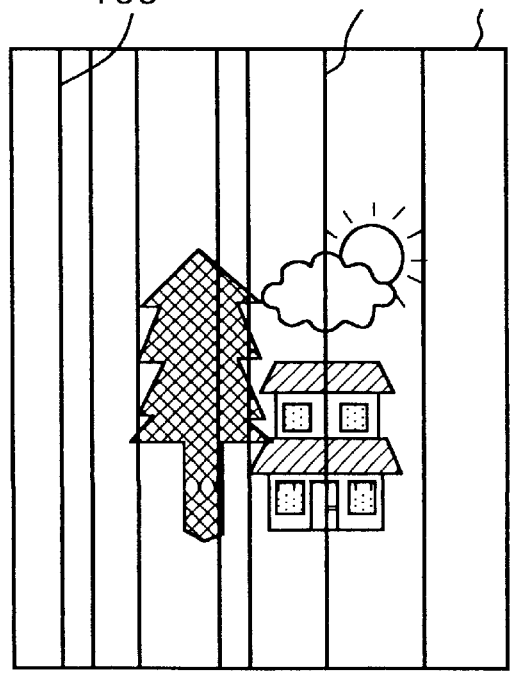
FIG. 9 is a drawing for explaining vertical lines generated because of density unevenness.

FIG. 8 is an explanatory view for explaining the density unevenness. Assume that the same level of a signal is provided to three adjacent nozzles to discharge ink. Since discharging characteristics of the nozzles are different, if the pixel array 165 in FIG. 8 represents a desired density, the pixel array 164 would have an output darker than the array 165 because of a larger amount of ink discharge, and the pixel array 166 would have an output lighter than the array 165 because of a smaller amount of ink discharge. If the printhead 201 having such uneven characteristics forms an image 161 shown in FIG. 9, vertical lines such as those indicated by reference numerals 162 or 163 are formed.

A head shading (HS) processing unit 517 included in the binarizing unit 512 solves the above described problem. The head shading processing unit 517 performs correction on image data in accordance with different discharging characteristics of each nozzle arranged in a row and controls the density unevenness represented by vertical lines.

Figure 10:
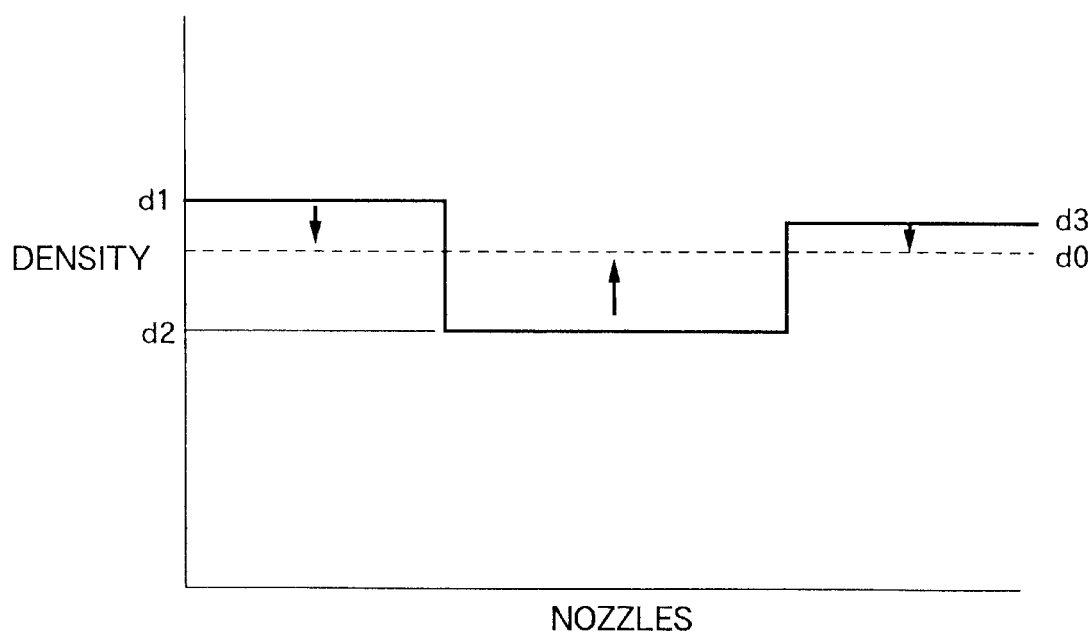
FIG. 10 is an explanatory view for explaining processing of an HS processing unit shown in FIG. 3.

FIG. 10 is a graph for explaining the processing performed by the HS processing unit 517. In FIG. 10, d0 indicates an average value of density of each dot obtained by driving all nozzles with a predetermined signal level. With respect to a signal which drives a nozzle outputting the density value d1 or d3 that is higher than the density average value d0, the HS processing unit 517 performs correction in a negative direction to reduce the signal level so that the driving signal is approximated to the average value d0. Meanwhile, with respect to a signal which drives a nozzle outputting the density value d2 that is lower than the density average value d0, the HS processing unit 517 performs correction in a positive direction to increase the signal level so that the driving signal is approximated to the average value d0. In other words, a signal level to be provided to the nozzle is increased or decreased based on the relationship between discharging characteristic of each of the nozzles and the average discharging characteristic of all the nozzles.

FIG. 11 is an explanatory view for explaining a concept of HS processing data (hereinafter referred to as "HS data"). A memory in which HS data is stored is divided into a number of memory areas that correspond to the number of nozzles constituting the printhead. Data indicative of a discharging characteristic of each nozzle is stored in each of the memory areas. The data indicative of the discharging characteristic (hereinafter referred to as "characteristic data") is a ratio between a density value dx determined by the discharging characteristic of each nozzle and average density d0 determined by the above-mentioned average discharging characteristics of all nozzles. Four groups of HS data 61 are prepared, one for each of C, M, Y and K nozzle arrays.

A plurality of nozzle characteristics stored in an HS gamma table 62 are expressed by a straight line or a curved line indicative of, e.g., a relationship between an input value and an output value. In other words, the number of the straight lines and curved lines indicative of the characteristics, which are entered in the HS gamma table 62, is prepared in accordance with the distribution of the discharging characteristics of nozzles. FIG. 12A shows a specific example of an HS table. FIG. 12B shows a specific example of an HS gamma table, and the above-described entry number of the HS gamma table is stored in a memory such as a ROM (hereinafter referred to as "HS gamma table memory").

As shown in FIG. 12A, the HS table stores offset values from the first address of the HS gamma table memory with respect to each of the n number of nozzles. For instance, in the case of the second nozzle, the gamma table is obtained from an address where an offset value 0x0300 is added to the first address of the HS gamma table memory. The foregoing description has explained the case where an offset value of the HS gamma table memory is stored as HS data. However, for instance, an absolute address of each gamma table stored in the HS gamma table memory may be obtained in advance and a pointer value that indicates the address may be stored as HS data.

Figure 13:
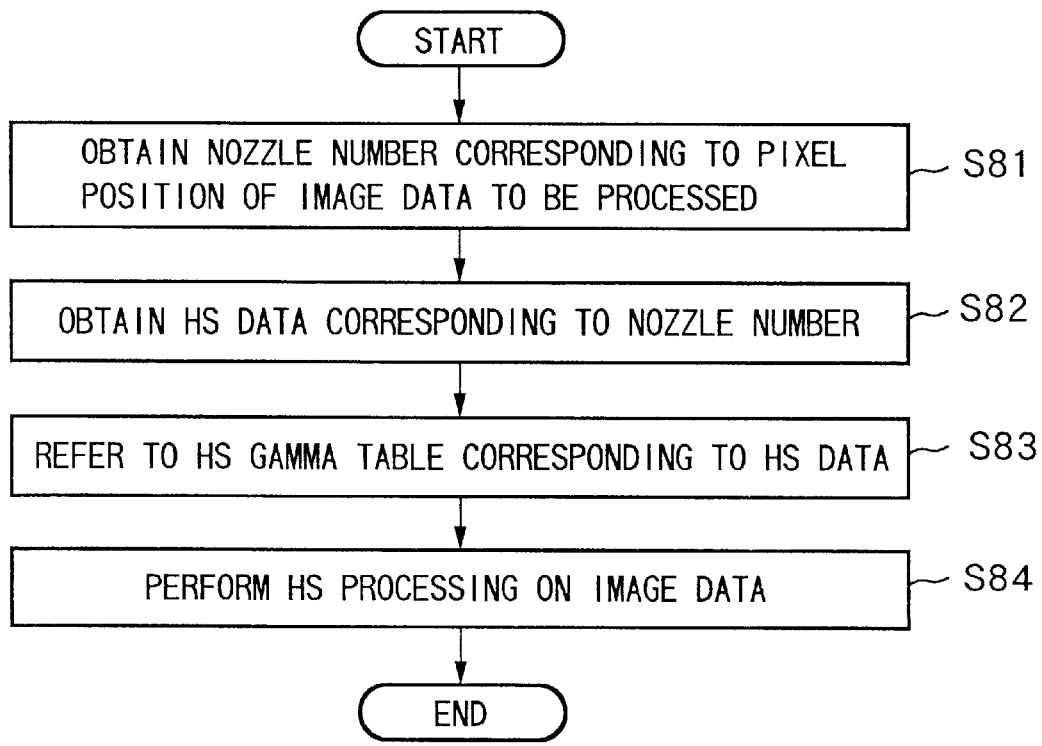
FIG. 13 is a flowchart showing HS processing.
Figure 27:
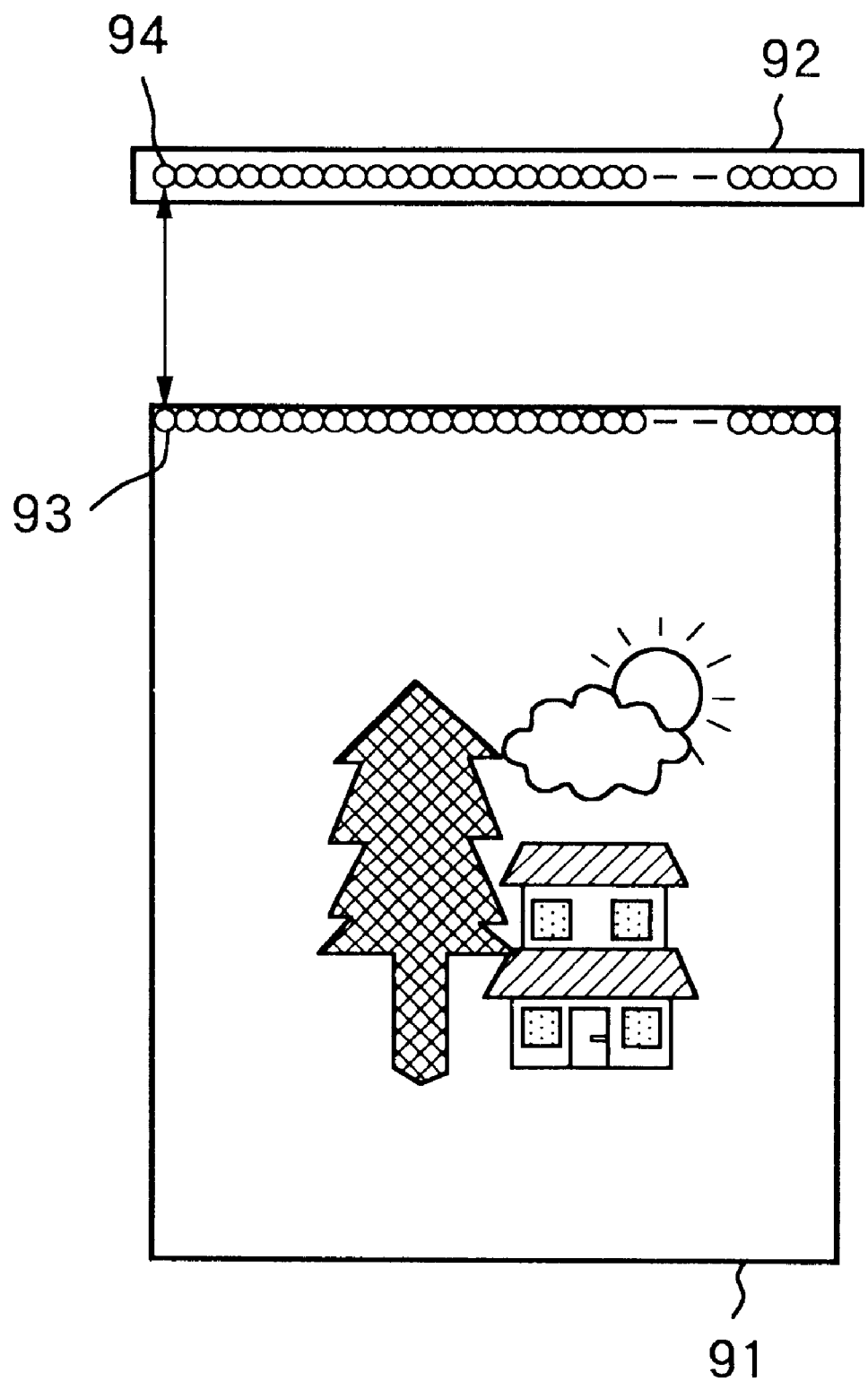
FIG. 27 is an explanatory view showing the relationship between a pixel position and a nozzle position.

FIG. 13 is a flowchart showing the HS processing. As apparent from the above description, HS processing requires recognition of the nozzle corresponding to the pixel position of image data. Thus, the HS processing unit first obtains a nozzle number corresponding to a pixel position of the image data to be processed in step S81. FIG. 27 is a drawing showing the relationship between a pixel position and a nozzle position. Reference numeral 91 in FIG. 27 denotes an image to be formed, which is an example of image data subjected to HS processing. Reference numeral 92 denotes a row of a printhead; and 93, a pixel located at the left end of the first line in the image 91. The pixel 93 is formed by the left nozzle 94 of the printhead 92. In the similar manner, all pixels of the image correspond to the nozzles which discharge ink.

In step S82 in FIG. 13, the HS processing unit obtains HS data which corresponds to a nozzle number from the HS table shown in FIG. 12A. In step S83, the HS processing unit refers to the HS gamma table memory on the basis of the obtained HS data. In step S84, the HS processing unit performs HS processing on the image data based on the obtained HS gamma table.

A TRC (Tone Reproduction Curve) processing unit 518 included in the binarizing unit 512 performs tone reproduction curve (TRC) processing on the image data on which HS processing has been performed. FIGS. 14A to 14D are graphs for explaining the TRC processing.

Figure 14A:
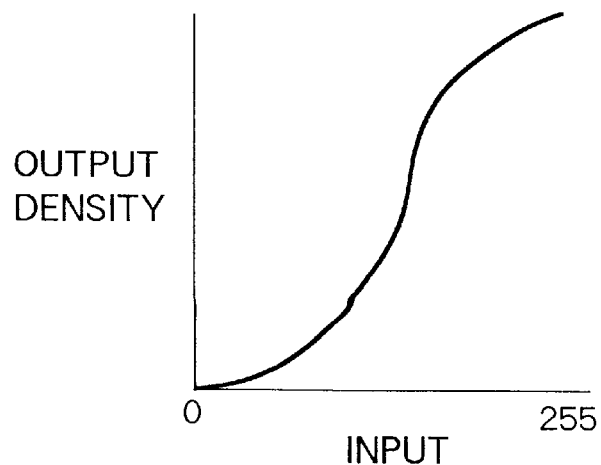

In a case where TRC processing is not performed, relationship between an image signal level and density of a formed image is represented by FIG. 14A. More specifically, the relationship between an input signal and output density is non-linear depending upon a binarization method, a printing medium, a type of ink, discharging characteristics of nozzles and so on. Accordingly, if an input signal is processed by a curved line (FIG. 14B) which is an inverse function of the curved line shown in FIG. 14A, the relationship between the input signal and output density can be made linear (FIG. 14C). The above processing is a technique to achieve smooth tonality in output density, and is called TRC processing. On the basis of the curved line shown in FIG. 14B, the relationship between input signal levels 0~255 and output signal levels 0~255 are calculated in advance, and a table such as that shown in FIG. 14D is generated on the basis of the calculation. TRC processing is performed based on the generated TRC table which is stored in a memory such as ROM or the like. Note that the TRC processing is normally performed for each plane of C, M, Y and K (or C, M and Y). Thus, four (or three) TRC tables are prepared.

A binarize processing unit 519 included in the binarizing unit 512 binarizes the image data on which TRC processing has been performed. Normally, the binarize processing unit 519 converts C, M, Y and K data each having 8 bits to C, M, Y and K data each having 1 bit. The well-known pseudo-halftone processing such as the dither method or error diffusion method or the like is utilized as a binarizing method. Simple binarization can be also utilized depending on the usage of an output image. The binarized image data is sent to the output unit 16.

Arrangement of Apparatus

FIG. 15 is a block diagram showing the arrangement of an image processing apparatus as the embodiment of the present invention.

Referring to FIG. 15, an image processing apparatus 1 receives image data which has been generated, modified, and outputted by software working on an external apparatus 2, e.g. a personal computer or the like, then performs predetermined image processing on the received image data, and sends the image data to an output apparatus 3 serving as a printer such as an IJP or the like to form an image.

In the image processing apparatus 1, an analyzing unit 11 analyzes image data sent by the external apparatus 2. The analyzing process includes processing for converting an image description form (e.g. PostScript® or the like) for application software working on the external apparatus 2, into image data corresponding to processing on the image processing apparatus 1.

A developing unit 12 performs various processing according to the analysis of the analyzing unit 11, and converts the image data inputted by the external apparatus 2 to image data which is to be sent to the output unit 16. The developing unit 12 includes the image processing unit 51 shown in FIG. 3. The image processing unit shown in FIG. 15 further includes a selecting unit 133 which selects an image process to be performed by the color processing unit 511 and binarizing unit 512.

A setting unit 14 includes a display such as an LCD or the like, a touch panel, a keyboard and so on, for displaying operation condition of the apparatus 1 and for setting image process conditions or the like. As shown in FIG. 16, the selecting unit 133 selects an image process in accordance with the image process conditions set by the setting unit 14. As a matter of course, the setting unit 14 can display a preview image on the display based on the image data which has been processed in accordance with the set image process conditions. Alternatively, instead of installing the setting unit 14 in the image processing apparatus 1, the setting unit 14 may be realized as a software which serves as a printer driver or a mode-setting utility for the image processing apparatus 1 working on the external apparatus 2.

The output unit 16 serves to convert the image data which has been processed by the developing unit 12, into output data which is to be sent to the output apparatus 3. For instance, in a case where the output apparatus 3 is an IJP, the output unit 16 outputs data in the form of a bit map, consisting of four planes of C, M, Y and K (or three planes of C, M and Y).

Process Steps

FIG. 17 is a flowchart showing the image processing performed by the image processing unit 51 in FIG. 15.

The image data inputted by the analyzing unit 11 is first subjected to color matching, luminance-density conversion, input correction and masking processing in steps S171–S174, by the color processing unit 511.

The selecting unit 133 then determines a setting condition of HS processing in step S175. In a case where the HS processing is set "ON", the processing proceeds to step S176 where HS processing is performed by the binarizing unit 512. In a case where the HS processing is set "OFF", the processing skips the HS processing.

Next, the binarizing unit 512 performs TRC processing in step S177, and in step S178, the selecting unit 133 determines a setting condition of an output mode to be described later. If a high-quality mode is set as an output mode, the processing proceeds to step S179 where the binarizing unit 512 performs error diffusion (ED) processing. If a high-speed mode is set as an output mode, the processing proceeds to step S180 where the binarizing unit 512 performs dither processing. If neither of the processing modes is selected, the processing proceeds to step S181 where simple binarization processing is performed.

Setting Image Process Condition

Figure 18A:
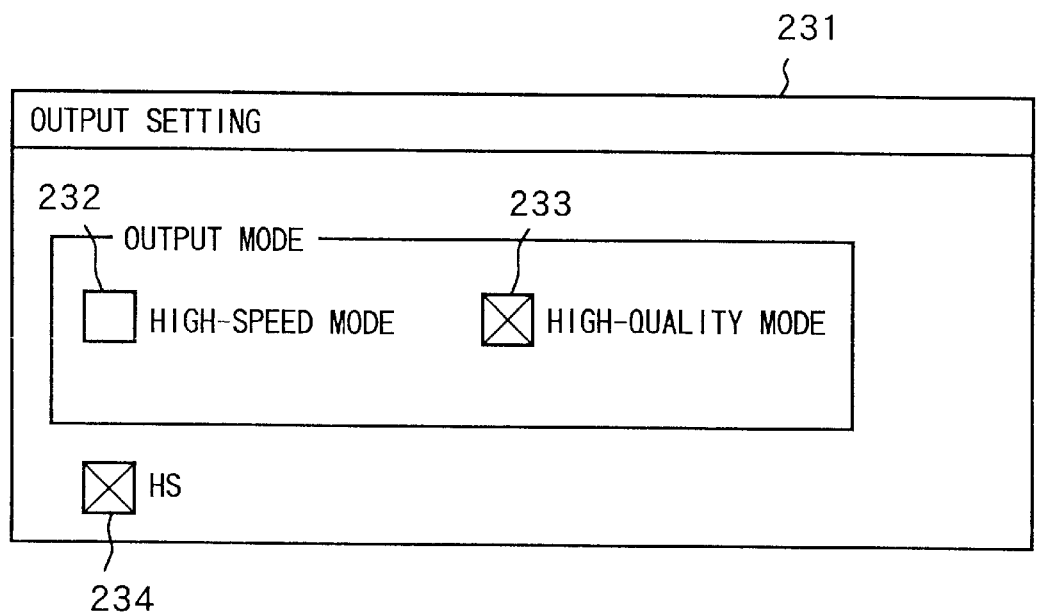
FIGS. 18A–18C are graphical display views displayed by a setting unit shown in FIG. 16.
Figure 18B:
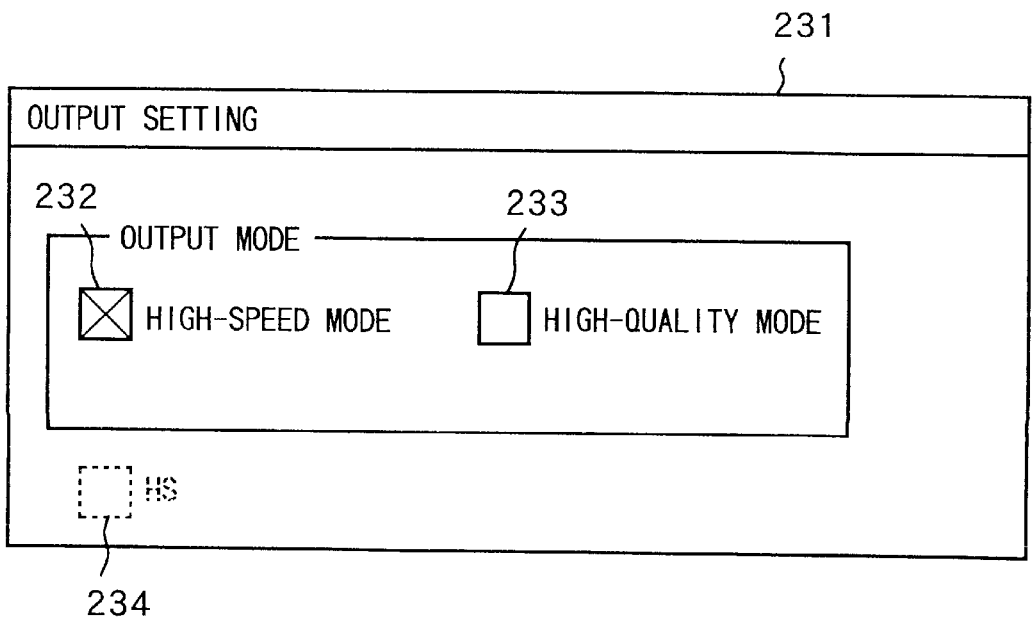
Figures 18C, 19:
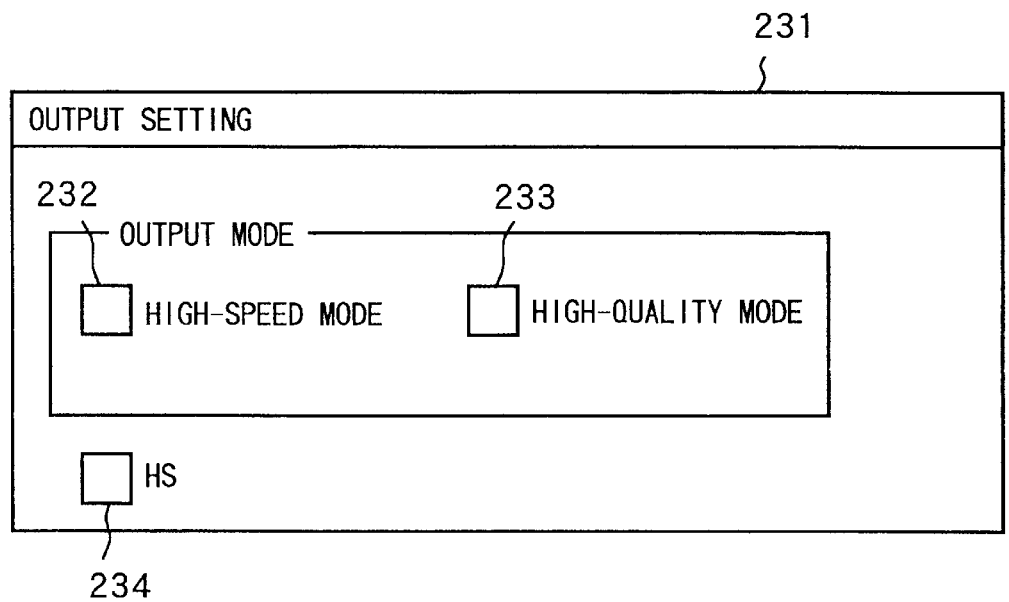
FIG. 19 is a table showing the relationship between the selecting modes and the turning ON/OFF of the HS processing.

The setting unit 14 graphically displays output modes indicative of image process conditions to allow a user to select an output mode. FIGS. 18A to 18C are explanatory views showing the graphical display by the setting unit 14. As can be seen by a dialogue for output setting 231 in FIG. 18A, the present embodiment includes the two types of output modes: the high-speed mode and high-quality mode, selected in step S178 in FIG. 17. A user can select a mode from these two modes by clicking the check box 232 or 233 with a pointing device e.g. a mouse or the like.

Herein, the high-speed mode is an output mode to print quickly without considering print quality, for the purpose of confirming a layout of an output image or the like, e.g., draft printing. When a user selects the high-speed mode, the selecting unit 133 selects dither processing capable of relatively quick processing, as a binarization process of the binarizing unit 512. Meanwhile, the high-quality mode is an output mode used when print quality is important in spite of longer printing period compared to that of the high-speed mode. When a user selects the high-quality mode, the selecting unit 133 selects error diffusion processing as a binarization process of the binarizing unit 512. Naturally, these two modes cannot be selected simultaneously. In addition, it is possible to set a black and white mode for printing an image that mainly includes characters, lines or tables. In such case, the selecting unit 133 selects simple binarization processing, which is the quickest process, as a binarization process of the binarizing unit 512.

The dialogue for output setting 231 also includes a check box 234 for setting/not setting the HS processing which corresponds to step S175 in FIG. 17. In a case where a user checks the check box 234, the selecting unit 133 makes the binarizing unit 512 perform HS processing; while in a case where the user does not check the check box 234, the selecting unit 133 makes the binarizing unit 512 not perform HS processing. Note that when the high-speed mode is set, the HS processing is imperatively turned off, displaying the check box 234 in gray as illustrated in FIG. 18B so that the HS processing cannot be performed. This is due to the fact that the high-speed mode does not require the processing for correcting density unevenness represented by vertical lines caused by HS processing. However, it is as a matter of course possible to turn on the HS processing in the high-speed mode, if desired. Meanwhile, in a case where the high-quality mode is set or neither of the modes is set, the HS processing may be arbitrarily turned on/off by the check box 234.

FIG. 19 shows relationships between the selecting modes and the turning ON/OFF of the HS processing. As described above, the high-speed mode and the high-quality mode cannot be set simultaneously. Also, in the case of high-speed mode, the HS processing cannot be turned on. Therefore, the corresponding column in the table of FIG. 19 is left empty. The image quality ranks shown in the table of FIG. 19 represent quality of an output image obtained when printing is performed with the shown selection mode and on/off of HS processing. When the high-quality mode is set and HS processing is turned on, the image quality rank 1, that is the highest level, is obtained. Meanwhile, when the high-speed mode is set, the image quality rank 5, that is the lowest level, is obtained. Besides the above combination, image quality is classified into ranks 2~4. Needless to say, ranks of the print speed is the opposite of the image quality ranks.

As has been described above, according to the present invention, image processing is set in accordance with image process conditions that have been set depending on usage of an output image. Therefore, image quality and processing speed suitable for the usage of the output image is achieved. In addition, a user is able to obtain an output image with efficiency, whose quality is suitable for the usage. More specifically, performing/not performing HS processing and the method of binarization can be changed in accordance with the combination of an output mode and on/off of the HS processing. For instance, in a case HS processing is turned on, image processing which achieves high quality is performed, while the HS processing is turned off, the high-speed processing is performed. Accordingly, image processing suitable for the usage of an output image can be efficiently performed.

Second Embodiment

Hereinafter, an image processing apparatus according to the second embodiment of the present invention will be described. Note that in the second embodiment, components having substantially the same functions as those of the first embodiment are referred by the same reference numerals and description thereof will be omitted.

According to the above-described first embodiment, the selecting unit 133 controls the HS processing and binarizing processing performed by the binarizing unit 512, in accordance with an output mode and on/off of the HS processing set by the setting unit 14. In the second embodiment, the selecting unit 133 controls the processing performed by the color processing unit 511 and the binarizing unit 512 in accordance with the setting set by the setting unit 14. Accordingly, a user is able to select the most appropriate processing mode from a setting range that is more flexible than that of the first embodiment, taking into consideration of a trade-off relationship between the process speed and image quality level.

Setting Image Process Condition

Figure 20:
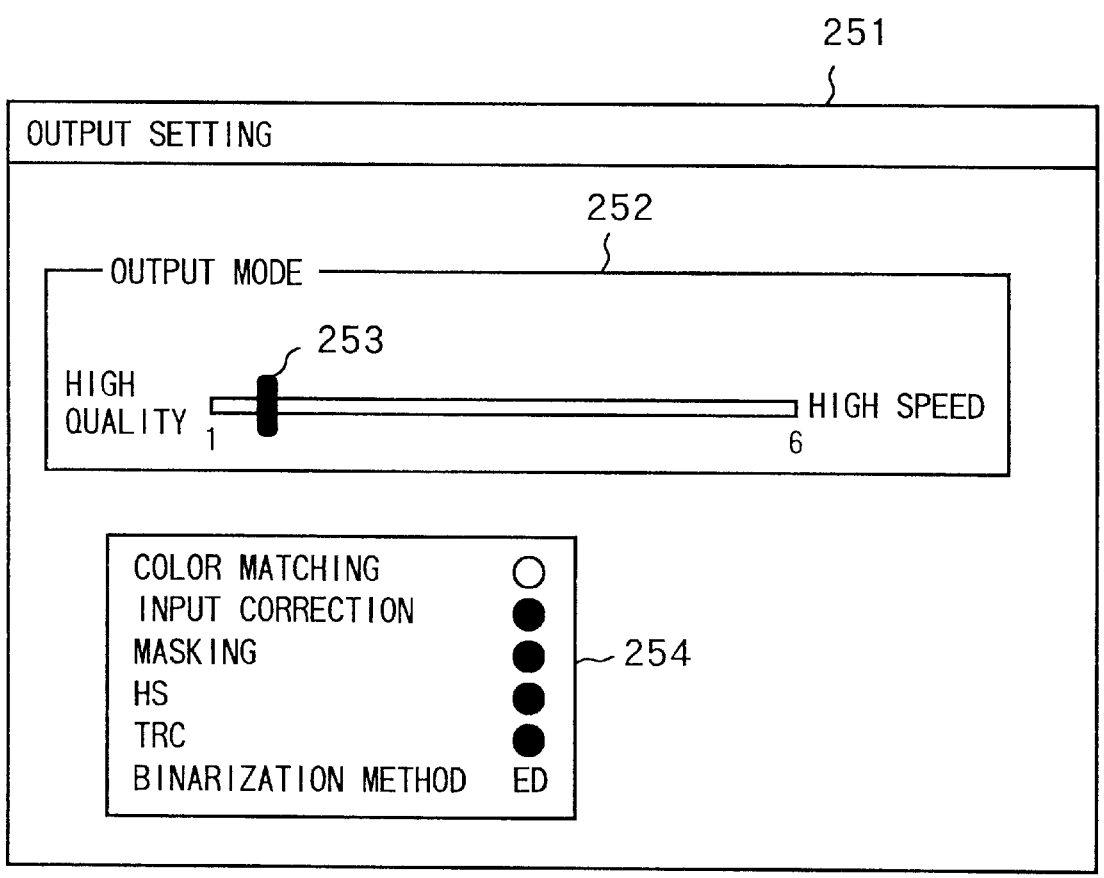
FIG. 20 is a display view of a print dialogue according to the second embodiment.

The dialogue for output setting 231 according to the first embodiment shown in FIG. 18A only provides three check boxes for the high-speed mode, high-quality mode, and HS processing; thus it is difficult for a user to immediately know the trade-off relationship of the processing speed and image quality level. FIG. 20 shows a dialogue for output setting 251 according to the second embodiment where an output mode is set by multiple levels (six levels in FIG. 20), utilizing a slider 253 in a setting section 252. More specifically, according to the present embodiment, a user is able to immediately know the relationship between the processing speed and image quality level by the position of the slider 253. In addition, the dialogue for output setting 251 includes a display section 254 which displays the processing to be performed in accordance with a set level of the output mode. For instance, in the display section 254, the processing to be performed at the set level of the output mode is indicated by the black circle mark ●, and the processing not performed is indicated by the white circle mark ○. With respect to a method of binarization, DP (dither processing) and ED (error diffusion processing) and so on are displayed.

FIG. 21 is a table showing the combination of levels of an output mode and processing to be performed. More specifically, when the level 1 is set as an output mode, all the processing in the image processing unit 51 is performed, and error diffusion processing is performed for binarization. At level 2 or a lower level, color matching processing is excluded, and at level 3 or a lower level, HS processing is further excluded and the binarization method is changed to dither processing. Moreover, at level 4 or a lower level, input correction is excluded; at level 5 or a lower level, TRC processing is excluded; and at level 6, only the luminance-density conversion is executed.

Arrangement of Image Processing Unit

Figure 22:
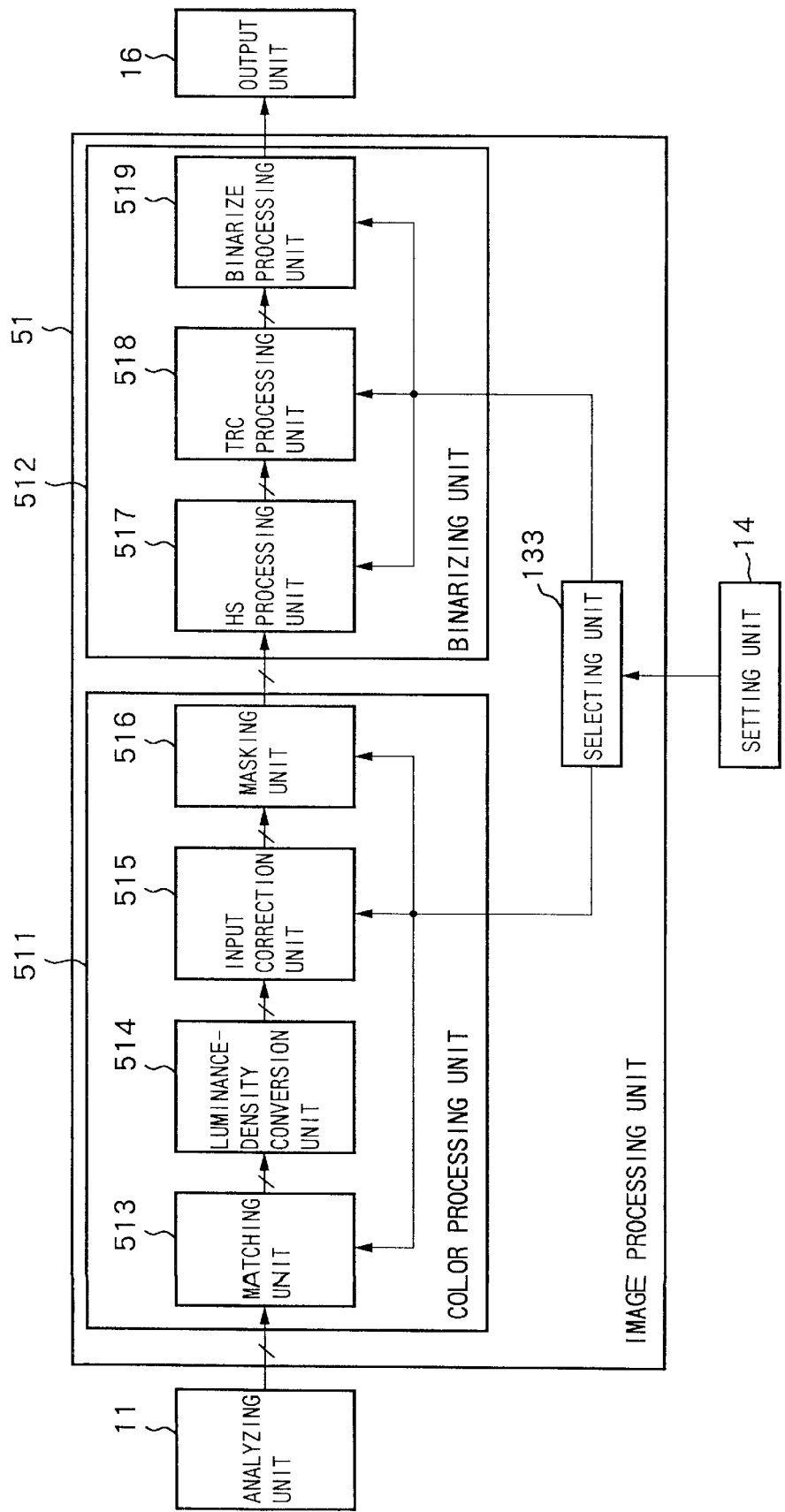
FIG. 22 is a block diagram showing the arrangement of the image processing unit according to the second embodiment.

FIG. 22 is a block diagram showing the arrangement of the image processing unit 51 according to the second embodiment. The selecting unit 133 controls the processing performed by the color processing unit 511 and the binarizing unit 512, in accordance with an image process condition, i.e. a level of an output mode, which is set by the setting unit 14.

Process Steps

Figure 23:
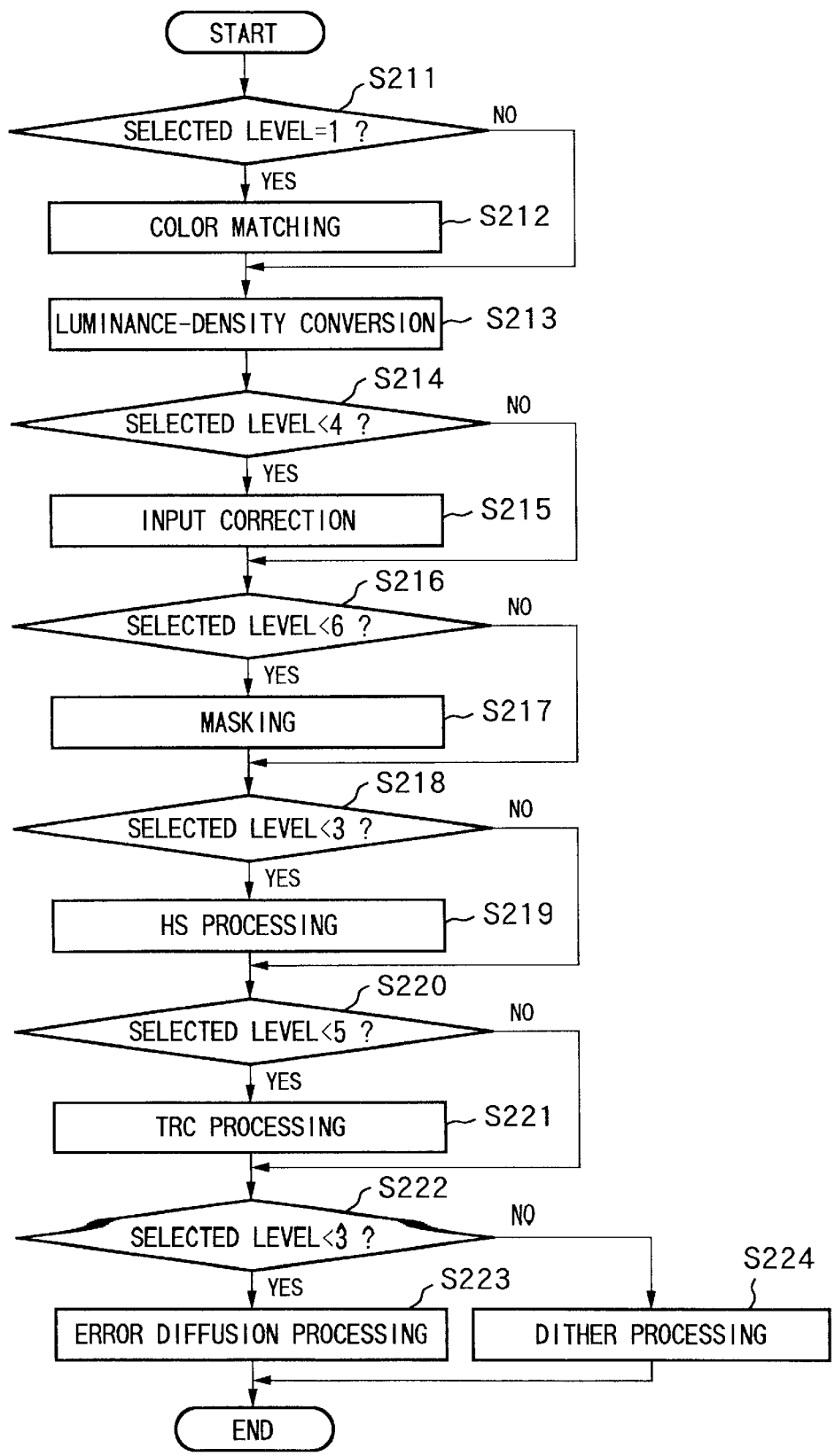
FIG. 23 is a flowchart showing the image processing performed by the image processing unit shown in FIG. 22.

FIG. 23 is a flowchart showing image processing performed by the image processing unit 51 shown in FIG. 22.

The selecting unit 133 first determines the type of image in step S211 a level of the set output mode (hereinafter referred to "selected level"). If the selected level is 1, color matching is executed in step S212, but if the selected lever is larger than 1, color matching is skipped.

Upon luminance-density conversion in step S213, the selecting unit 133 determines the selected level in step S214. If the selected level is less than 4, input correction is performed in step S215, but if the selected level is 4 or larger, input correction is skipped.

The selecting unit 133 then determines the selected level in step S216. If the selected level is less than 6, masking is performed in step S217, but if the selected level is 6 or larger, masking is skipped. The selecting unit 133 next determines the selected level in step S218. If the selected level is less than 3, HS processing is performed in step S219, but if the selected level is 3 or larger, HS processing is skipped. The selecting unit 133 next determines the selected level in step S220. If the selected level is less than 5, TRC processing is performed in step S221, but if the selected level is 5 or larger, TRC processing is skipped.

Next, the selecting unit 133 determines the selected level in step S222. If the selected level is less than 3, the error diffusion process is performed in step S223, but if the selected level is 3 or larger, dither processing is performed in step S224.

Third Embodiment

Hereinafter, an image processing apparatus according to the third embodiment of the present invention will be described. Note that in the third embodiment, components having the similar arrangement as those of the first embodiment are referred by the same reference numerals and description thereof will be omitted.

The third embodiment adopts an expanded form of the above-described second embodiment. According to the third embodiment, a user is able to set levels of output modes in correspondence with types of image. More specifically, the selecting unit 133 controls processing performed by the color processing unit 511 and binarizing unit 512 in accordance with a selected level of an output mode that corresponds to each type of an image analyzed by the analyzing unit 11. According to the above process, it is possible to perform a selected level of image processing that is corresponding to the type of the image. For instance, image processing most appropriate for the type of image, e.g. a photographic image, texts including color characters, or graphics or the like. In other words, it is possible to perform processing by selectively utilizing a highly-precise process for a photographic image or the like and utilizing a high-speed process for a graphic or text image.

Setting Image Process Condition

Figure 24:
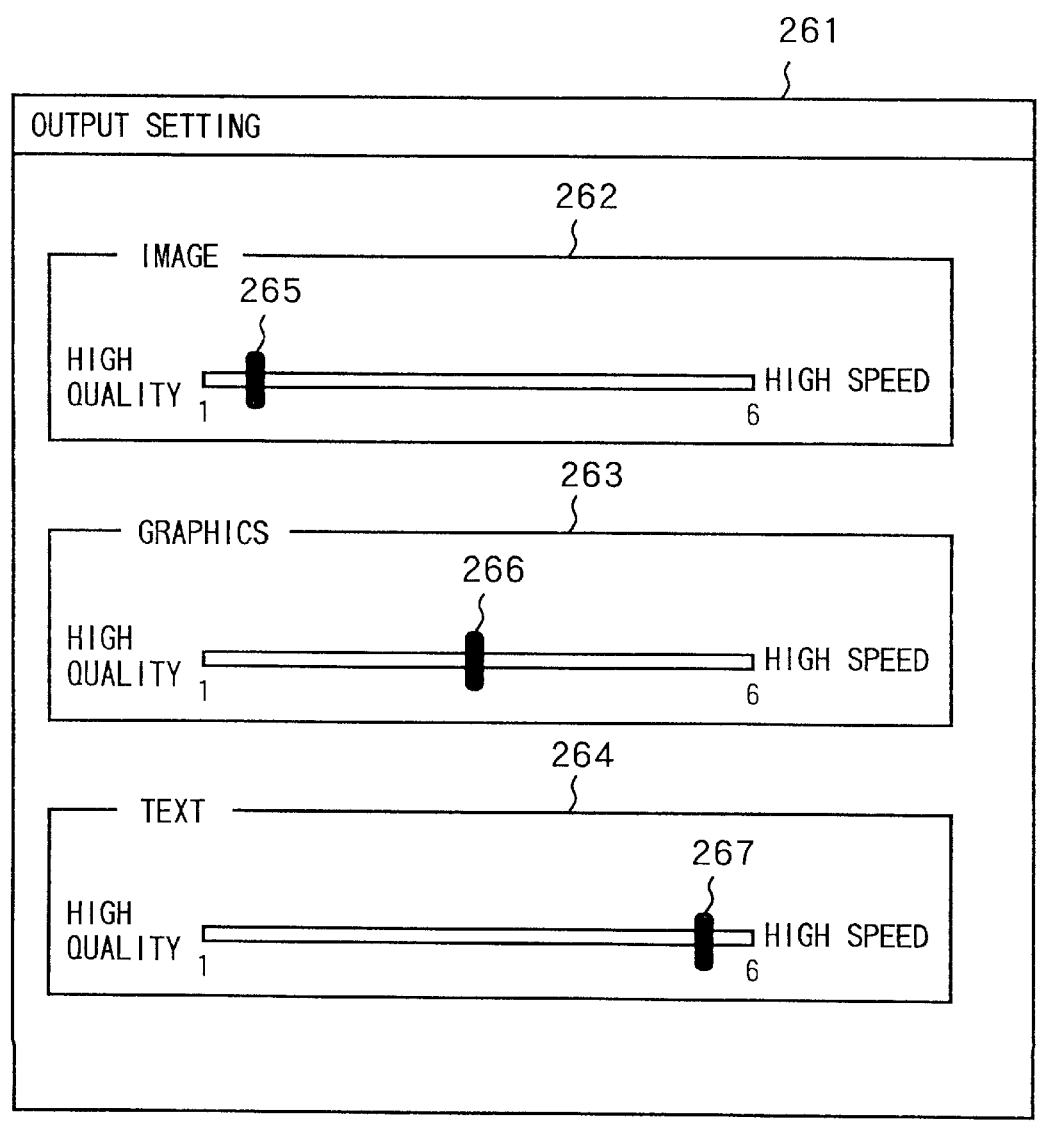
FIG. 24 is a display view of a print dialogue according to the third embodiment.

FIG. 24 shows a dialogue for output setting 261 according to the third embodiment, which includes an image output mode setting unit 262 which corresponds to a photographic image or the like, a graphic output mode setting unit 263 which corresponds to graphics such as CG, and a text output mode setting unit 264 which corresponds to documents or the like. The output mode can be set in multiple levels (six levels in FIG. 24) in accordance with the types of an image.

Note that the relationship between a selected mode and a process performed by the image processing unit 51 is the same as that described with reference to FIG. 21, thus explanation thereof will be omitted.

Arrangement of Image Processing Unit

Figure 25:
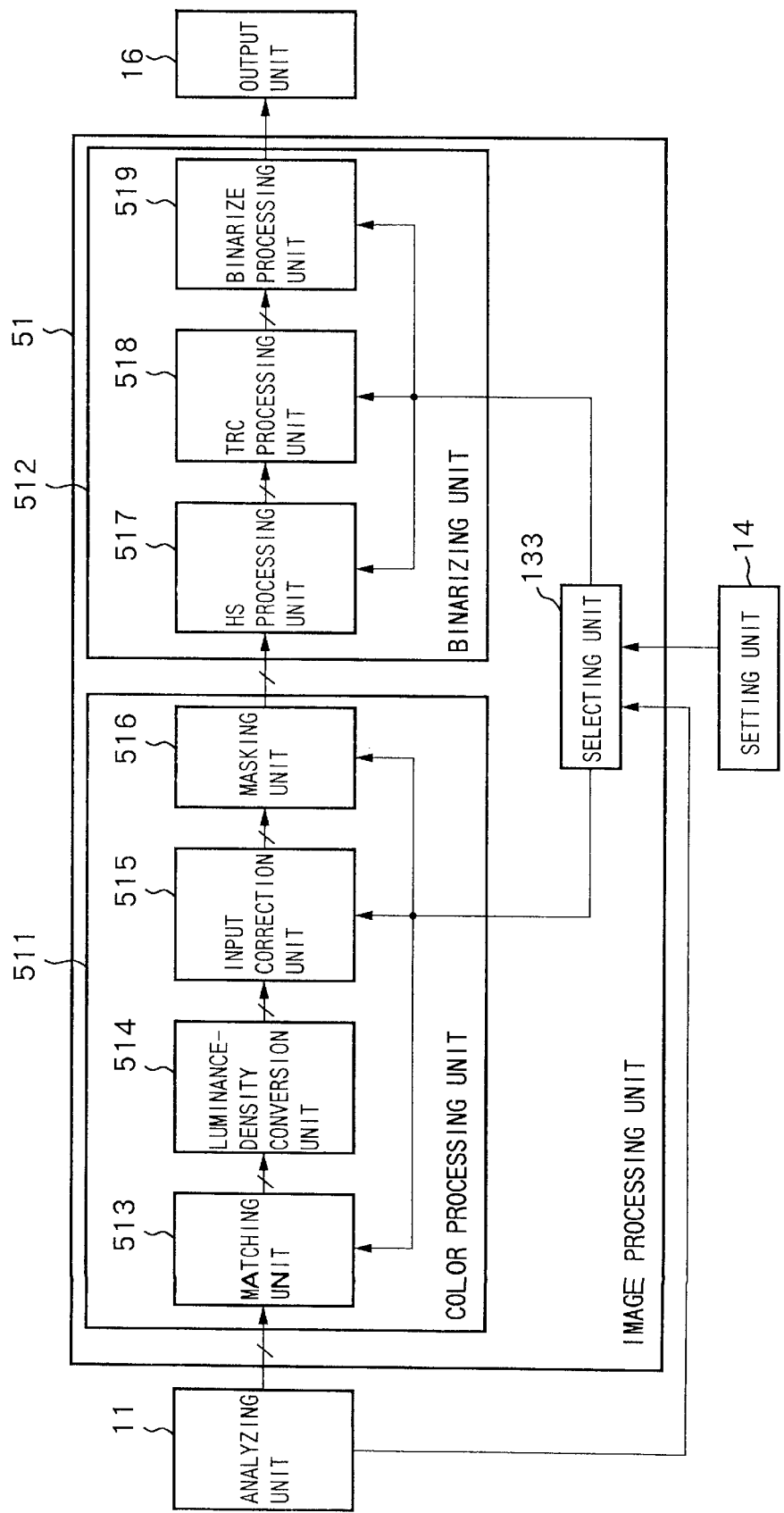
FIG. 25 is a block diagram showing the arrangement of the image processing unit according to the third embodiment.

FIG. 25 is a block diagram showing the arrangement of the image processing unit 51 according to the third embodiment. The selecting unit 133 controls processing performed by the color processing unit 511 and binarizing unit 512, in accordance with the type of image analyzed by the analyzing unit 11 and an image process condition set by the setting unit 14. Note that the analysis performed by the analyzing unit 11 to analyze the type of an image will not be described herein. However, for instance, the analyzing unit 11 is able to notify the type of image to the selecting unit 133 by adding data (a tag) which distinguishes the type of image, e.g. image, graphics or text, to image data.

Process Steps

Figure 26:
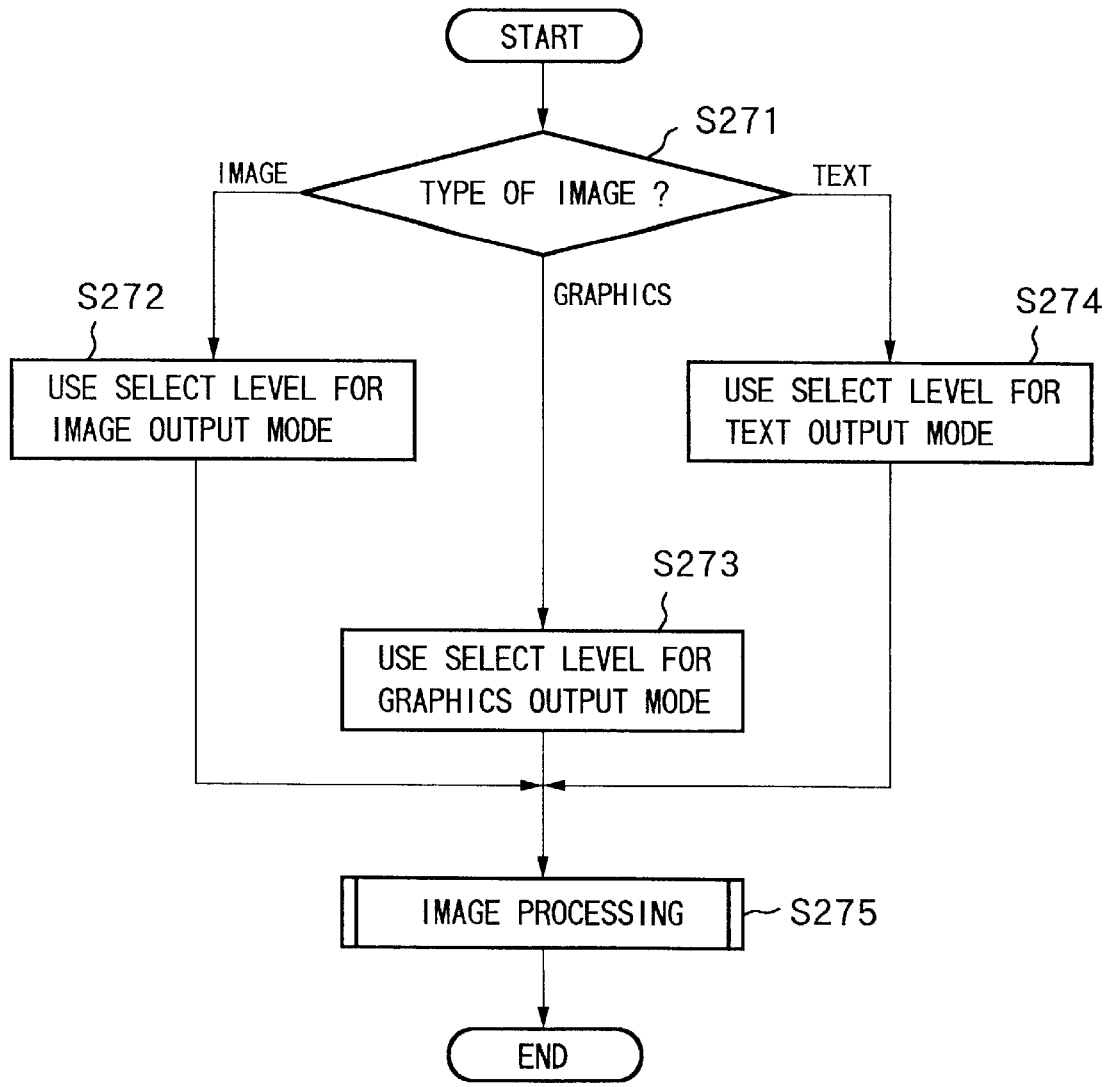
FIG. 26 is a flowchart showing the image processing performed by the image processing unit shown in FIG. 25.

FIG. 26 is a flowchart showing image processing performed by the image processing unit 51 shown in FIG. 25.

The selecting unit 133 first determines the type of image in step S271. If the image is a photographic image, the selecting unit 133 selects a select level for the image output mode in step S272 and performs image processing in step S275. If the image is graphics, the selecting unit 133 selects a select level for the graphic output mode in step S273 and performs image processing in step S275. If the image is a text image, the selecting unit 133 selects a select level for the text output mode in step S274 and performs image processing in step S275. The image processing performed in step S275 is similar to that of the processing shown in FIG. 23, thus the description thereof will be omitted.

Note that the print dialogue shown in FIG. 24 may include the display section 254 as shown in FIG. 20 to display the processes to be executed in accordance with a level of the set output mode.

Modification

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments. Briefly, the storage medium stores each module shown as an example of a memory map in FIG. 28 or FIG. 29. More specifically, program codes which correspond to "head shading module," "quantization processing module" and "image process control module"; program codes which correspond to "color matching module," "tone characteristic correction module," "masking module," "head shading module," "tone reproductive characteristic correction module," "quantization processing module" and "image process control module"; program codes which correspond to "printing element correction module," "half-tone processing method selection module" and "correction condition setting module", at least, are to be stored in the storage medium.

In each of the foregoing embodiments, descriptions have been provided on binarization as the method of quantization processing. However, the present invention is not limited to this, but may be other quantization in quaternary system or ternary system. In addition, the method of correction in correspondence with an image position is not limited to the above-described embodiment, but other methods may be utilized.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
   first process means for performing color matching processing on inputted image data;
   second process means for converting the image data outputted by said first process means into density image data;
   third process means for performing masking processing on the density image data outputted by said second process means;
   fourth process means for performing correction on the density image data outputted by said third process means in accordance with a pixel position;
   quantization means for quantizing the density image data outputted by said fourth process means;
   control means for controlling at least one of the process operations of said first to fourth process means and the quantization method performed by said quantization means; and
   setting means for setting a level of at least one of image quality and image processing speed,
   wherein said control means performs the control based on the image process condition set by said setting means.

2. The apparatus according to claim 1, wherein said setting means displays whether or not the processing by said first to fourth process means is to be executed and displays a quantization method to be performed by said quantization means, in accordance with the set level of image quality or image processing speed.

3. The apparatus according to claim 1, wherein said control means controls at least one of each of the process operation of said first to fourth process means and the quantization method performed by said quantization means, in a manner such that a combination of image processing corresponds to the set level of image quality or image processing speed set by said setting means.

4. The apparatus according to claim 1, further comprising determine means for determining a type of an image represented by the inputted image data,
   wherein said control means controls at least one of each of the process operation of said first to fourth process means and the quantization method performed by said quantization means in accordance with the type determined by said determine means.

5. The apparatus according to claim 1, further comprising forming means for recording a visible image on a recording medium on the basis of the image data quantized by said quantization means.

6. The apparatus according to claim 5, wherein said forming means includes recording means having a plurality of recording elements arrayed substantially perpendicular to a conveying direction of the recording medium, each of said plurality of recording elements being driven on the basis of the quantized image data.

7. An image processing method comprising:
   a first process step of performing color matching processing on inputted image data;
   a second process step of converting the image data processed in said first process step into density image data;
   a third process step of performing masking processing on the density image data processed in said second process step;
   a fourth process step of performing correction on the density image data processed in said third process step in accordance with a pixel position;
   a step of quantizing the density image data processed in said fourth process step;
   a step of controlling at least one of the process operations in said first to fourth process steps and the quantization method performed in said quantizing step; and
   a step of setting a level of at least one of image quality and image processing speed,
   wherein the control in said controlling step is performed based on the image process condition set in said setting step.

8. A storage medium storing computer-readable program codes for performing image processing, comprising:
   program codes for a first process step of performing color matching processing on inputted image data;
   program codes for a second process step of converting the image data processed in said first process step into density image data;
   program codes for a third process step of performing masking processing on the density image data processed in said second process step;
   program codes for a fourth process step of performing correction on the density image data processed in said third process step in accordance with a pixel position;
   program codes for a step of quantizing the density image data processed in said fourth process step;
   program codes for a step of controlling at least one of the process operations in said first to fourth process steps and the quantization method performed in said quantizing step; and program codes for a step of setting a level of at least one of image quality and image processing speed, wherein the control in said controlling step is performed based on the image process condition set in said setting step.

9. An image processing apparatus for recording an image by utilizing a plurality of recording elements, comprising:

correcting means for correcting unevenness of the plurality of recording elements;

selecting means for selecting a half-tone processing method; and setting means for setting correction operation of said correcting means in accordance with the selected half-tone processing method.

10. The apparatus according to claim 9, wherein the half-tone processing method includes error diffusion processing.

11. The apparatus according to claim 10, wherein, in a case where the error diffusion processing is selected as the half-tone processing method, said correcting means performs the correction.

12. The apparatus according to claim 9, wherein the half-tone processing method includes dither processing.

13. The apparatus according to claim 12, wherein, in a case where the dither processing is selected as the half-tone processing method, said correcting means does not perform the correction.

14. The apparatus according to claim 9, wherein each of the plurality of recording elements comprises a nozzle which discharges droplets.

15. The apparatus according to claim 14, wherein the droplets are discharged from the nozzle by film boiling.

16. The apparatus according to claim 9, wherein each of the plurality of recording elements comprises a heating unit of a thermal printhead.

17. An image processing method for recording an image, utilizing a plurality of recording elements, comprising the steps of:

correcting unevenness of the plurality of recording elements;

selecting a half-tone processing method; and setting correction operation in said correcting step in accordance with the selected half-tone processing method.

18. The method according to claim 17, wherein the half-tone processing method includes error diffusion processing.

19. The method according to claim 18, wherein in a case where the error diffusion processing is selected as the half-tone processing method, the correction in said correcting step is performed.

20. The method according to claim 17, wherein said half-tone processing method includes dither processing.

21. The method according to claim 20, wherein in a case where the dither processing is selected as the half-tone processing method, the correction in said correcting step is not performed.

22. The method according to claim 17, wherein each of the plurality of recording elements is a nozzle which discharges droplets.

23. The method according to claim 22, wherein the droplets are discharged from the nozzle by film boiling.

24. The method according to claim 17, wherein each of the plurality of recording elements is a heating unit of a thermal printhead.

25. A storage medium storing computer-readable program codes for recording an image, utilizing a plurality of recording elements, comprising:

program codes a step of correcting unevenness of the plurality of recording elements;

program codes a step of selecting a half-tone processing method; and program codes a step of setting correction operation in said correcting step in accordance with the selected half-tone processing method.

* * * * *

UNITED STATES PATENT AND TRADEMARK OFFICE
CERTIFICATE OF CORRECTION

PATENT NO.   : 6,025,929
DATED        : February 15, 2000
INVENTOR(S)  : Nakajima et al.

It is certified that error appears in the above-identified patent and that said Letters Patent is hereby corrected as shown below:

IN THE COVER PAGE:

At [73], Assignee: "Canon Kabushiki Kaisha, Tokyo, Japan" should read --Canon Kabushiki Kaisha, Tokyo; Canon Aptex Kabushiki' Kaisha, Mitsukaido, both of Japan--.

DRAWING SHEET 18
Fig. 21, HIGHT" (both occurrences) should read --HIGH--.

DRAWING SHEET 25
Fig. 28, "DISPLAYNING" should read --DISPLAYING--.

COLUMN 1
Line 24, "black (k)" should read --black (K) --.

COLUMN 4
Line 55, "same" should read --the same--.

COLUMN 10
Line 18, "referred" should read --referred to--.

UNITED STATES PATENT AND TRADEMARK OFFICE
CERTIFICATE OF CORRECTION

PATENT NO. : 6,025,929
DATED : February 15, 2000
INVENTOR(S) : Nakajima et al.

It is certified that error appears in the above-identified patent and that said Letters Patent is hereby corrected as shown below:

<u>COLUMN 11</u>
Line 13, "a level" should read --and a level--;
Line 14, "to" should read --to as--;
Line 15, "lever" should read --level--; and
Line 43, "referred" should read --referred to--.

Signed and Sealed this

Twelfth Day of June, 2001

*Attest:*

NICHOLAS P. GODICI
*Attesting Officer*    *Acting Director of the United States Patent and Trademark Office*